(12) United States Patent
Hu et al.

(10) Patent No.: US 12,075,436 B2
(45) Date of Patent: Aug. 27, 2024

(54) SCHEDULING INDICATION METHOD AND APPARATUS, AND STORAGE MEDIUM

(71) Applicant: ZTE CORPORATION, Shenzhen (CN)

(72) Inventors: Youjun Hu, Shenzhen (CN); Bo Dai, Shenzhen (CN); Weiwei Yang, Shenzhen (CN); Huiying Fang, Shenzhen (CN); Kun Liu, Shenzhen (CN); Luanjian Bian, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 283 days.

(21) Appl. No.: 17/633,172

(22) PCT Filed: Jul. 28, 2020

(86) PCT No.: PCT/CN2020/105121
§ 371 (c)(1),
(2) Date: Feb. 4, 2022

(87) PCT Pub. No.: WO2021/023058
PCT Pub. Date: Feb. 11, 2021

(65) Prior Publication Data
US 2022/0287070 A1    Sep. 8, 2022

(30) Foreign Application Priority Data
Aug. 5, 2019  (CN) .......................... 201910718562.2

(51) Int. Cl.
*H04W 72/12* (2023.01)
*H04W 72/23* (2023.01)

(52) U.S. Cl.
CPC .................................. *H04W 72/23* (2023.01)

(58) Field of Classification Search
CPC ..... H04W 72/23; H04L 5/0053; H04L 5/0078; H04L 5/0094
See application file for complete search history.

(56) References Cited

U.S. PATENT DOCUMENTS

| | | | | |
|---|---|---|---|---|
| 2014/0044084 A1* | 2/2014 | Lee | ........................ | H04L 1/1861 370/329 |
| 2014/0321382 A1* | 10/2014 | Guan | ..................... | H04W 72/20 370/329 |

(Continued)

FOREIGN PATENT DOCUMENTS

| | | |
|---|---|---|
| CN | 103179672 | 6/2013 |
| CN | 109963342 | 7/2019 |

(Continued)

OTHER PUBLICATIONS

Extended European Search Report for European Application No. 20849590.3 dated Jul. 5, 2023.

(Continued)

*Primary Examiner* — Luat Phung
(74) *Attorney, Agent, or Firm* — Knobbe, Martens, Olson & Bear, LLP

(57) ABSTRACT

Provided are a scheduling indication method, a scheduling indication apparatus and a storage medium. The scheduling indication method includes: scheduling multiple shared channels through a single physical downlink control channel (PDCCH), where scheduling information is carried in the single PDCCH and is used to indicate scheduling for a process corresponding to each of the multiple shared channels, and the multiple shared channels include a physical uplink shared channel (PUSCH) and/or a physical downlink shared channel (PDSCH).

16 Claims, 1 Drawing Sheet

Multiple shared channels are scheduled through a single physical downlink control channel — S120

(56) References Cited

U.S. PATENT DOCUMENTS

| | | | |
|---|---|---|---|
| 2016/0227523 A1* | 8/2016 | Desai | H04W 72/23 |
| 2016/0323854 A1 | 11/2016 | Gao et al. | |
| 2022/0287070 A1 | 9/2022 | Hu et al. | |

FOREIGN PATENT DOCUMENTS

| | | |
|---|---|---|
| CN | 110535610 | 12/2019 |
| KR | 20180108392 | 10/2018 |
| WO | WO 2014-169868 | 10/2014 |
| WO | WO 2017/025066 A1 | 2/2017 |

OTHER PUBLICATIONS

Chinese Office Action for the Chinese Application No. 201910718562.2, dated Dec. 26, 2022.

Decision to Grant the Chinese Application No. 201910718562.2, dated Mar. 8, 2023.

Feb. 9-13, 2015, Sony, MTC Operation with a Narrowband PDCCH, 16 pages.

Oct. 17, 2022, Office Action for Application No. 2019107185622, 10 pages.

Oct. 10, 2022, Search Report for Application No. 2019107185622, 3 pages.

LG Electronics, "Candidate techniques for DL control for LTE URLLC" 3GPP TSG RAN WGI Meeting #92 r1-1802180, Mar. 2, 2018.

International Search Report of Oct. 28, 2020 for International patent Application No. PCT/CN2020/105121. 4 pages.

NTT Docomo, Inc. "Enhancements on multi-TRP/panel transmission", 3GPP TSG RAN WG1 Ad-Hoc Meeting 1901 R1-19000978 Taipei, Jan. 21-25, 2019.

Korean Office Action for Korean Application No. 10-2022-7007236 dated May 16, 2024.

Singapore Office Action for Singapore Application No. 11202201062P dated Apr. 8, 2024.

* cited by examiner

Multiple shared channels are scheduled through a single physical downlink control channel ⌇S120
FIG. 1
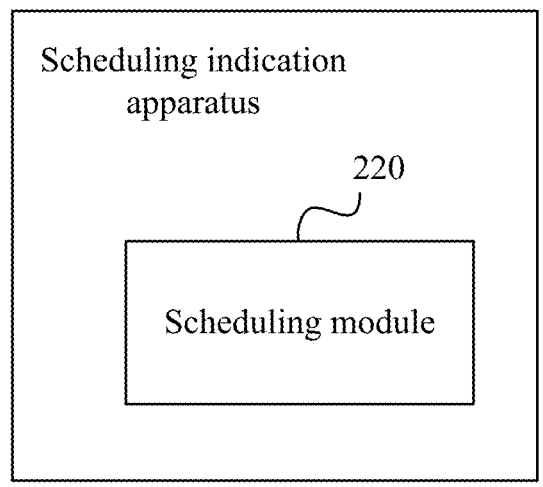
FIG. 2
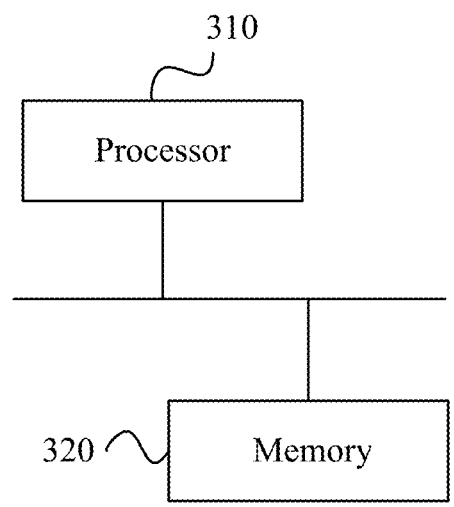
FIG. 3

SCHEDULING INDICATION METHOD AND APPARATUS, AND STORAGE MEDIUM

CROSS-REFERENCE TO RELATED APPLICATION(S)

This is a national stage application filed under 37 U.S.C. 371 based on International Patent Application No. PCT/CN2020/105121, filed Jul. 28, 2020, which claims priority to Chinese Patent Application No. 201910718562.2 filed Aug. 5, 2019, the disclosures of both of which are incorporated herein by reference in their entireties.

FIELD

The present disclosure relates to wireless communication networks, for example, to a scheduling indication method, a scheduling indication apparatus, and a storage medium.

BACKGROUND

In a multiple transport block (TB) scheduling scenario, since hybrid transport is supported, in a case where lots of processes are scheduled, for supporting the highest flexibility, downlink control information (DCI) overhead is significantly increased due to indications for process scheduling, resulting in degrading of performance of physical downlink control channels (PDCCH).

SUMMARY

A scheduling indication method, a scheduling indication apparatus, and a storage medium are provided according to the present disclosure to ensure that multiple TB scheduling would not bring too much DCI overhead.

A scheduling indication method is provided according to embodiments of the present disclosure, which includes:
  scheduling multiple shared channels through a single physical downlink control channel (PDCCH);
  where, scheduling information is carried in the single PDCCH, and is used to indicate scheduling for processes corresponding to the multiple shared channels, and the multiple shared channels include a physical uplink shared channel (PUSCH) and/or a physical downlink shared channel (PDSCH).

A scheduling indication apparatus is provided according to embodiments of the present application, which includes:
  a scheduling module configured to schedule multiple shared channels through a single physical downlink control channel (PDCCH);
  where, scheduling information is carried in the single PDCCH, and is used to indicate scheduling for processes corresponding to the multiple shared channels, and the multiple shared channels include a physical uplink shared channel (PUSCH) and/or a physical downlink shared channel (PDSCH).

A storage medium is provided according to embodiments of the present application, which stores a computer program, and the computer program, when being executed by a processor, implements the scheduling indication method according to any embodiment of the present disclosure.

BRIEF DESCRIPTION OF DRAWINGS

FIG. 1 is a flowchart of a scheduling indication method according to an embodiment of the present disclosure;

FIG. 2 is a structural block diagram of a scheduling indication apparatus according to an embodiment of the present disclosure; and FIG. 3 is a schematic structural diagram of a device according to an embodiment of the present disclosure.

DETAILED DESCRIPTION

Embodiments of the present disclosure are described below in detail with reference to the drawings.

Based on the phase of version Release-16, with respect to multiple TB scheduling in scheduling enhancement in enhanced machine type communication (eMTC), hybrid transport and non-hybrid transport are supported when multiple TB scheduling is supported. Based on the scheduling enhancement, indications of process scheduling include information about process identifiers of scheduled processes and new data indication (NDI) corresponding to the scheduled processes. Since in the case of multiple TB scheduling, DCI overhead may be increased significantly due to the process scheduling indications. In view of this, in the embodiments of the present disclosure, reducing the DCI overhead as much as possible is implemented from three aspects: indications for processes scheduling, modulation and coding scheme (MCS) domain compression, and resource allocation domain compression.

In an embodiment, by configuring scheduling information corresponding to the scheduling indications of processes, the indications for process scheduling in the DCI is realized with a low overhead.

FIG. 1 is a flowchart of a scheduling indication method according to an embodiment of the present disclosure and this embodiment is applicable to a case where DCI size is reduced as much as possible during multiple process scheduling. This embodiment may be implemented by a transmitting end or a receiving end, where the transmitting end may be a base station or a user equipment (UE), and the receiving end may also be a base station or a UE. In a case where the transmitting end is a base station, the receiving end is a UE; in a case where the receiving end is a UE, the transmitting end is a base station; in a case where the receiving end is a UE, the transmitting end may also be a UE; in a case where the transmitting end is a base station, the receiving end may also be a base station. In an embodiment, the scheduling indication method in this embodiment may be applied to a machine type communication (MTC) system, or may be applied to other systems, such as a new radio (NR), a narrow band internet of things (NB-IoT) or the like.

As shown in FIG. 1, the method according to this embodiment includes:

S120: multiple shared channels are scheduled through a single physical downlink control channel (PDCCH).

The scheduling information is carried in the single PDCCH, and is used to indicate scheduling for processes corresponding to the multiple shared channels. The shared channels include a physical uplink shared channel (PUSCH) and/or a physical downlink shared channel (PDSCH).

In an embodiment, in a case of a large number of processes, if a highest flexibility is supported, the DCI size may be caused too large, which degrades the performance of PDCCH. In this embodiment, on the premise of ensuring certain flexibility, the problem of too large DCI size caused by multiple TB scheduling is avoided, thereby ensuring the performance of PDCCH. In this embodiment, the DCI size is reduced as much as possible by configuring scheduling information to ensure the performance of PDCCH.

In an embodiment, the scheduling information includes process identification information and new data indication (NDI) information corresponding to the processes. The process identification information is used to indicate information about indexes of scheduled processes, or is used to indicate information about a start position of indexes of scheduled processes and a number of processes. The scheduling indication method configured in this embodiment is used in a case where multiple shared channels is scheduled through one PDCCH and scheduling for multiple processes is indicated by scheduling information. The solution in this embodiment is to directly indicate the processes by indicating the scheduling of Y processes with X-bit scheduling information, that is, the X-bit scheduling information may include process identification information and NDI information corresponding to each scheduled process.

In an embodiment, in a case where a maximum number of processes scheduled through the downlink control information (DCI) is H, the scheduling information is X-bit, and a scheduling state index indicated by the scheduling information is M.

In an embodiment, the value of M is determined according to at least process identification information of currently scheduled processes and NDI information corresponding to the currently scheduled processes.

In an embodiment, when j processes are scheduled through a PDCCH, the characteristics of the scheduling state index M satisfies the following conditions:

being shifted by $A1+x_m 2^{j-1}+x_{m+1}2^{j-2}+ \ldots +x_{m+j-1}2^0$, or being shifted by $A2+x_{m+j-1}2^{j-1}+x_{m+j-2}2^{j-2}+ \ldots +x_m 2^0$.

Where, M refers to a value indicated by a DCI process indication, j is the number of currently scheduled processes, m is a process identifier of a process at a start position of processes, and the NDI information corresponding to the j currently scheduled processes is $x_m, x_{m+1}, \ldots, x_{m+j-1}$, and $j \in \{1, 2, 3 \ldots, H\}$.

In an embodiment, the value of M being determined according to at least process identification information of currently scheduled processes and NDI information corresponding to the currently scheduled processes, includes:

the value of M is increased in accordance with a number of scheduled processes increasing; or, the value of M is increased in accordance with a start position of scheduled processes increasing.

In an embodiment, the value of M being increased in accordance with the number of scheduled processes increasing, satisfies:

$$M = m*2^j + x_m 2^{j-1} + x_{m+1}2^{j-2} + \ldots + x_{m+j-1}2^0 + \sum_{i=1}^{j-1} 2^i(H+1-i) + a$$

where, j is the number of the currently scheduled processes, m is a process identifier of a process at a start position of processes, and NDI information corresponding to j currently scheduled processes is, $x_m, x_{m+1}, \ldots, x_{m+j-1}, \ldots, j \in \{1, 2, 3 \ldots, H\}$, $0 <= m <= H-j$, $x_m, x_{m+1}, \ldots, x_{m+j-2}, x_{m+j-1} \in \{0, 1\}$, a is a start value of M, and a is an integer.

In an embodiment, in a case where the value of M is increased in accordance with the number of scheduled processes increasing, the identifier assignment starts when the number of scheduled processes is 1, that is, the minimum value of j is 1. Moreover, when the number of scheduled processes is larger, the corresponding value of M is larger. For a same number of processes, the start position of processes is larger, the corresponding value of M is larger. It is assumed that the identifiers of all scheduled processes start from 0 to H−1, where H is the supported maximum number of processes scheduled through DCI. In the DCI, if the number of currently scheduled processes is j and the process identifier of a process at a start position of processes is m, the scheduled process identifiers corresponding to the j scheduled processes are m, m+1, and . . . m+j−1, and the corresponding NDI information is, $x_m, x_{m+1}, \ldots, x_{m+j-1}$, $j \in \{1, 2, 3 \ldots, H\}$, where $0 <= m <= H-j$, $x_m, x_{m+1}, \ldots, x_{m+j-2}, x_{m+j-1} \in \{0,1\}$, a is the start value of M, and a is an integer.

In an embodiment, when the maximum number of processes scheduled through DCI is 8, $j \in \{1,2,3,4,5,6,7,8\}$, $0<=m<=8-j$. If the scheduled processes are consecutive, the identifiers of the scheduled processes are m, m+1, and . . . m+j−1. Accordingly, the process information indicated in DCI and NDI information may be represented by the following formula:

$$M = m*2^j + x_m 2^{j-1} + x_{m+1}2^{j-2} + \ldots + x_{m+j-1}2^0 + \sum_{i=1}^{j-1} 2^i(9-i) + 1$$

where $j \in \{1,2,3,4,5,6,7,8\}$, $0<=m<=8-j$, and $x_m, x_{m+1}, \ldots, x_{m+j-2}, x_{m+j-1} \in \{0,1\}$.

In an embodiment, in a case where process scheduling for two or more processes is supported, $2<=j<=H-m$.

In an embodiment, in order to distinguish between a hybrid transport state and a non-hybrid transport state, the NDI information corresponding to each scheduled process is not completely the same.

In an embodiment, when H=4, a value range of M is [a, a+51], and there are 52 states in total, then 6 bits are required for indication.

In an embodiment, the value of M is described by taking H=8 as an example. Table 1 is a table showing a relationship between the value of M and the value of j in which the value of M is increased in accordance with the number of scheduled processes increasing, where a=1.

TABLE 1

Table of Relationship between the Value of M and the Value of j, in which the Value of M is increased in accordance with the number of scheduled processes increasing

| Value of j | Value of m | Value of M | Effect | Remarks |
|---|---|---|---|---|
| 1 | 0 <= m <= 7 | 1~16 | Assigning 16 states of a single process with identifiers as 1~16 | When m = 0. The values of M are taken as 1 and 2, when m = 7, the values of M are taken as 15 and 16, if 1-bit NDI corresponding to 1 process has 2 values, then when m = 0, a number of the values of M is 2. |

TABLE 1-continued

Table of Relationship between the Value of M and the Value of j, in which the Value of M is increased in accordance with the number of scheduled processes increasing

| Value of j | Value of m | Value of M | Effect | Remarks |
|---|---|---|---|---|
| 2 | $0 \leq m \leq 6$ | 17~44 | Assigning 28 states of 2 consecutive processes with identifiers as 17~44 | When m = 0, the values of M are taken as 17~20, when m = 6, the values of M are taken as 41~44, in this case, 2 processes correspond to 2-bit NDI, and a number of the values of M corresponding to one m is 4. |
| 3 | $0 \leq m \leq 5$ | 45~92 | Assigning 48 states of 3 consecutive processes with identifiers as 45~92 | When m = 0, the values of M are taken as 45~52, when m = 5, the values of M are taken as 85~92, in this case, 3 processes correspond to 3-bit NDI, and a number of the values of M corresponding to one m is 8. |
| 4 | $0 \leq m \leq 4$ | 93~172 | Assigning 80 states of 4 consecutive processes with identifier as 93~172 | When m = 0, the values of M are taken as 93~108, when m = 4, the values of M are taken as 157~172, in this case, 4 processes correspond to 4-bit NDI, and a number of the values of M corresponding to one m is 16. |
| 5 | $0 \leq m \leq 3$ | 173~300 | Assigning 128 states of 5 consecutive processes with identifier as 173~300 | When m = 0, the values of M are taken as 173~204, when m = 3, the values of M are taken as 269~300, in this case, 5 processes correspond to 5-bit NDI, and a number of the values of M corresponding one m is 32. |
| 6 | $0 \leq m \leq 2$ | 301~492 | Assigning 192 states of 6 consecutive processes with identifier as 301~492 | When m = 0, the values of M are taken as 301~364, when m = 2, the values of M are taken as 461~492, in this case, 6 processes correspond to 6-bit NDI, and a number of the values of M corresponding one m is 64. |
| 7 | $0 \leq m \leq 1$ | 493~748 | Assigning 256 states of 7 consecutive processes with identifier as 493~748 | When m = 0, the values of M are taken as 493~620, when m = 1, the values of M are taken as 621~748, in this case, 7 processes correspond to 7-bit NDI, and a number of the values of M corresponding to one m is 128. |
| 8 | m = 0 | 749~1004 | Assigning 256 states of 8 consecutive processes with identifier as 749~1004 | in this case, m can only be 0, and there are 256 identifiers according to different NDIs, in this case, 8 processes correspond to 8-bit NDI, and a number of the values of M corresponding to one m is 256. | a is an integer and may be used as a preset value; a may also be canceled when the value of a is 0. As shown in Table 1, the value of M is increased in accordance with the number j of scheduled processes increasing. For example, in a case of j=1 and 0<=m<=7, the value of the scheduling state index M is ranged from 1 to 16; for another example, in a case of j=2 and 0<=m<=6, the value of the scheduling state index M is ranged from 17 to 44, others likewise, the value of M is increased in accordance with the number j of scheduled processes increasing, and in a case of j=8 and m=0, the value of the scheduling state index M is ranged from 749 to 1004.

In an embodiment, the value of M being increased in accordance with a start position of scheduled processes increasing, satisfies:

$$M = \sum_{p=1}^{j-1} 2^p + \sum_{q=0}^{m-1} \sum_{r=1}^{H-q} 2^r + x_m 2^{j-1} + x_{m+1} 2^{j-2} + \ldots + x_{m+j-1} 2^0 + a$$

where, j is the number of processes currently scheduled, m is a process identifier of a process at a start position of processes, and NDI information corresponding to j currently scheduled processes is, $x_m, x_{m+1}, \ldots, x_{m+j-1}$, $j \in \{1, 2, 3, \ldots, H\}$, $0 \leq m \leq H-j$, $1 \leq j \leq H-m$, $x_m, x_{m+1}, \ldots, x_{m+j-2}, x_{m+j-1} \in \{0,1\}$, a is the start value of M, and a is an integer.

In an embodiment, in a case where the value of M is increased in accordance with increasing of the start position of scheduled processes, all scheduled processes are assigned identifiers from 0 up to H, where H is the supported maximum number of processes scheduled in DCI. In a case where start positions of the processes scheduled are the same, the number of scheduled processes is larger, and the value of M is larger. In DCI, if the number of currently scheduled processes is j and a process identifier of a process at a start position of processes is m, the scheduled process identifiers corresponding to the j scheduled processes are m, m+1, and . . . m+j−1, and the corresponding NDI information is, $x_m, x_{m+1}, \ldots, x_{m+j-1}$, $j \in \{1, 2, 3, \ldots, H\}$, $0<=m<=H-j$, $1<=j<=H-m$, $x_m, x_{m+1}, \ldots, x_{m+j-2}$, $x_{m+j-1} \in \{0,1\}$, a is the start value of M, and a is an integer.

$$M = \sum_{p=1}^{j-1} 2^p + \sum_{q=0}^{m-1} \sum_{r=1}^{H-q} 2^r + x_m 2^{j-1} + x_{m+1} 2^{j-2} + \ldots + x_{m+j-1} 2^0 + a$$

In an embodiment, when the maximum number of processes of DCI scheduling is 8, $j \in \{1,2,3,4,5,6,7,8\}$, $1<=m<=9-j$. If the scheduled processes are consecutive, the identifiers of the scheduled processes are m, m+1, and ... m+j−1. Accordingly, the process information and the NDI information indicated by DCI may be represented by the following formula:

$$M = \sum_{p=1}^{j-1} 2^p + \sum_{q=0}^{m-1} \sum_{r=1}^{8-q} 2^r + x_m 2^{j-1} + x_{m+1} 2^{j-2} + \ldots + x_{m+j-1} 2^0 + a$$

where, $j \in \{1,2,3,4,5,6,7,8\}$, $0<=m<=H-j$, $1<=j<=H-m$, and $x_m, x_{m+1}, \ldots, x_{m+j-2}, x_{m+j-1} \in \{0,1\}$.

In an embodiment, in a case where scheduling for two or more processes is supported, $2<=j<=H-m$.

In an embodiment, in order to distinguish a hybrid transport state from a non-hybrid transport state, NDI information corresponding to the scheduled processes is not completely the same.

In an embodiment, the value of M is described by taking H=8 as an example. Table 2 is a table showing a relationship between the value of M and the value of j in which the value of M is increased in accordance with a start position of scheduled processes increasing according to an embodiment of the present disclosure, in which a=1.

TABLE 2

Table of a Relationship between the value of M and the value of j, in which the value of M is increased in accordance with the start position of scheduled processes increasing

| Value of m | Value of 2 | Value of M | Effect | Remarks |
|---|---|---|---|---|
| 0 | $0 <= j <= 8$ | 1~510 | Starting from process 0, process 1 to process 8 assigned with scheduling state identifiers as 1~510, totaling 510 states | When j = 1, the values of M are taken as 1 and 2, when j = 8, the values of M are taken as 255~510 |
| 1 | $0 <= j <= 7$ | 511~764 | Starting from process 1, process 1 to process 7 assigned with scheduling state identifiers as 511~764, totaling 254 states | When j = 1, the values of M are taken as 511 and 512, when j = 7, the values of M are taken as 637~764 |
| 2 | $0 <= j <= 6$ | 765~890 | Starting from process 2, process 1 to process 6 assigned with scheduling state identifiers as 765~890, totaling 126 states | When j = 1, the values of M are taken as 765 and 766, when j = 6, the values of M are taken as 827~890 |
| 3 | $0 <= j <= 5$ | 891~952 | Starting from process 3, process 1 to process 5 assigned with scheduling state identifiers as 891~952, totaling 62 states | When j = 1, the values of M are taken as 891 and 892, when j = 5, the values of M are taken as 921~952 |
| 4 | $0 <= j <= 4$ | 953~982 | Starting from process 4, process 1 to process 4 assigned with scheduling state identifiers as 953~982, totaling 30 states | When j = 1, the values of M are taken as 953~954, when j = 4, the values of M are taken as 967~982 |
| 5 | $0 <= j <= 3$ | 983~996 | Starting from process 5, process 1 to process 3 assigned with scheduling state identifiers as 983~996, totaling 14 states | When j = 1, the values of M are taken as 983 and 984, when j = 3, the values of M are taken as 989~996 |
| 6 | $0 <= j <= 2$ | 997~1002 | Starting from process 6, process 1 to process 2 assigned with scheduling state identifiers as 997~1002, totaling 6 states | When j = 1, the values of M are taken as 997 and 998, when j = 2, the values of M are taken as 999~1002 |
| 7 | j = 1 | 1003~1004 | Scheduling process 7, totaling 2 states | M has 2 states according to NDI value, the 2 states of M are assigned with identifiers as 1003 and 1004 |

In an embodiment, different process numbers correspond to different NDI bit numbers, that is, for the same start position, numbers of the values of M corresponding to different j are different. a may be used as a preset value, or may be canceled when the value of a is 0.

In an embodiment, the relationship between the scheduling state index and the number of scheduled processes or a start position of scheduled processes is described by using the calculation formula of the value of M, by way of example through Table 1 and Table 2, which is relatively simple and does not require a list. In addition, according to the method indicated by the formula, for a mode A of the MTC, the overhead is 10 bits, occupying a small DCI overhead, and guarantying a certain flexibility.

In an embodiment, in a case where the number of currently scheduled processes is x, $2^x*(9-x)$ indicates the number of states of scheduling processes corresponding to the process number x, i.e., 9−x indicates the number of positions for scheduling x processes consecutively. For example, when x=8, 8 processes are scheduled, then there is only one consecutive position. According to the formular $$\sum_{x=1}^{8} 2^x * (9-x) = 1004,$$

it can be obtained that, in a case of x=8, it requires 10 bits for indication. Each process corresponds to 1-bit NDI information; and thus x processes correspond to 2^x states. For example, 8 processes have been assigned with process identifiers as 0, 1, 2, 3, 4, 5, 6, and 7, respectively. In a case of scheduling for 8 processes (01234567), there are 256 states; in a case of scheduling for 7 processes (for example, 0123456 and 1234567), there are 2*128 states, i.e., 256 states; in a case of scheduling for 6 processes (for example, 012345, 123456, 234567), there are 3*64 states, i.e., 192 states; in a case of scheduling for 5 process (for example, 01234, 12345, 23456, 34567), there are 4*32 states, i.e., 128 states; in a case of scheduling for 4 processes (for example, 0123, 1234, 2345, 3456, 4567), there are 5*16 states, i.e., 80 states; in a case of scheduling for 3 processes (for example, 012, 123, 234, 345, 456, 567), there are 6*8 states, i.e., 48 states; in a case of scheduling for 2 processes (for example, 01, 12, 23, 34, 45, 56, 67), there are 7*4 states, i.e., 28 states; in a case of scheduling for a single process (for example, 0, 1, 2, 3, 4, 5, 6, 7), there are 8*2 states, totaling 16 states. In above, there are 1004 states in total, and 10 bits can be used to realize indication therefor.

In an embodiment, in a case where the maximum number H of processes scheduled through DCI is 4, 5 bits may be used for indication directly. The scheduling information is used to indicate the scheduling states of processes with the process numbers as the power of 2, that is, scheduling for processes with the process numbers as 1, 2, or 4. In a case where the maximum number H of processes scheduled through DCI is 4, and scheduling information X is 5 bits, the scheduling state includes one of the following: in a case where the number of currently scheduled processes is 4, the number of the scheduling state includes sixteen $x_0x_1x_2x_3$; in a case where the e number of the currently scheduled processes is 2, the number of the scheduling state includes four $x_0x_1$ and four $x_2x_3$; in a case where the number of the currently scheduled processes is 1, the number of the scheduling state includes two $x_0$, two $x_1$, two $x_2$ and two $x_3$, where $x_0$, $x_1$, $x_2$ and $x_3$ respectively correspond to NDI information corresponding to a processes with a process identifier 0, NDI information corresponding to a processes with a process identifier 1, NDI information corresponding to a processes with a process identifier 2 and NDI information corresponding to a processes with a process identifier 3, and each of $x_0$, $x_1$, $x_2$ and $x_3 \in \{0,1\}$. In a case where the identifiers of 4 processes is 0, 2, and 3, then when 4 processes are scheduled, the scheduled processes are 0123, and the scheduling states include: process 0 (NDI=$x_0$) process 1 (NDI=$x_1$) process 2 (NDI=$x_2$) process 3 (NDI=$x_3$), where NDI information of each process includes two states of 1 and 0, thus, the 16 states corresponding to the scheduled processes 0123 are respectively 0000, 0001, 0010, 0100, 1000, 0011, 0101, 1001, 1010, 1100, 0110, 0111, 1110, 1011, 1101 and 1111. Accordingly, when 2 processes are scheduled, the scheduled processes may be 01 and 23, totaling 2*4 states, that is, process 0 (NDI=$x_0$) process 1 (NDI=$x_1$), process 2 (NDI=$x_2$) process 3 (NDI=$x_3$); when 1 process is scheduled, the scheduled process may be 0, 1, 2 and 3, totaling 4*2 states, that is, process 0 (NDI=$x_0$), process 1 (NDI=$x_1$), process 2 (NDI=$x_2$), process 3 (NDI=$x_3$). Based from which, there are 32 states obtained in total, thus it requires 5 bits for indication. It can be known that, in this embodiment, for 4 processes of coverage enhanced (CE) Mode B, the DCI size occupied is the smallest.

In an embodiment, in a case where the maximum number H of processes scheduled through DCI is 4, 6 bits may be used for indication directly. The scheduling information is used to indicate process scheduling through DCI for scheduling processes with any process number, that is, scheduling for processes with process numbers as 1, 2, 3 and 4. Moreover, process identifiers of processes with a process number being multiple are consecutive. In a case where the maximum number H of processes scheduled through DCI is 4, and scheduling information X is 6 bits, the scheduling state includes one of the following: in a case where the number of currently scheduled processes is 4, the number of the scheduling state includes sixteen $x_0x_1x_2x_3$; in a case where the number of the currently scheduled processes is 3, the number of the scheduling state includes eight $x_0x_1x_2$ and eight $x_1x_2x_3$; in a case where the number of the currently scheduled processes is 2, the number of the scheduling state includes four $x_0x_1$, four $x_1x_2$, four $x_2x_3$, four $x_1x_3$, four $x_0x_3$ and four $x_0x_2$; in a case where the number of the currently scheduled processes is 1, the number of the scheduling state includes two $x_0$, two $x_1$, two $x_2$ and two $x_3$, where $x_0$, $x_1$, $x_2$ and $x_3$ respectively correspond to NDI information corresponding to a process with a process identifier 0, NDI information corresponding to a process with a process identifier 1, NDI information corresponding to a process with a process identifier 2 and NDI information corresponding to a process with a process identifier 3, and each of $x_0$, $x_1$, $x_2$ and $x_3 \in \{0,1\}$. In a case where the identifiers of 4 processes is 0, 1, 2, and 3, and when 4 processes are scheduled, the scheduled processes are 0123, and the scheduling states include: process 0 (NDI=$x_0$) process 1 (NDI=$x_1$) process 2 (NDI=$x_2$) process 3 (NDI=$x_3$); when 3 processes are scheduled, the scheduled processes may be 012 and 123, and the scheduling states include: process 0 (NDI=$x_0$) process 1 (NDI=$x_1$) process 2 (NDI=$x_2$), process 1 (NDI=$x_1$) process 2 (NDI=$x_2$) process 3 (NDI=$x_3$); when 2 processes are scheduled, the scheduled processes may be 01 and 23, totaling 2*4 states, that is, process 0 (NDI=$x_0$) process 1 (NDI=$x_1$), process 2 (NDI=$x_2$) process 3 (NDI=$x_3$); when 1 process is scheduled, the scheduled process may be 0, 1, 2 and 3, totaling 4*2 states, that is, process 0 (NDI=$x_0$), process 1 (NDI=$x_1$), process 2 (NDI=$x_2$), process 3 (NDI=$x_3$). Based from which, 64 states may be obtained in total; and thus, it requires 6 bits for indication. It can be known that, in the method according to this embodiment, the overhead occupied is 6 bits which is a small overhead, and in the solutions using 6 bits for indication, the method in this embodiment achieves the highest flexibility.

In an embodiment, the scheduling information includes information for indicating scheduling for a single process or multiple processes, process identification information, and NDI information corresponding to processes. The process identification information is used to indicate index information of scheduled processes, or a start position of indexes of scheduled processes and process number information. The scheduling indication method configured in this embodiment can be applied in a case where multiple shared channels is scheduled through one PDCCH, and the scheduling for multiple processes are indicated by indication information. The solution in this embodiment uses X bits to indicate scheduling for Y processes, and the X-bit scheduling information may include 1 bit indication information for indicating scheduling for a single process or for multiple processes.

In an embodiment, for scheduling 4 processes, when 1 bit indicates scheduling for a single TB, the process scheduling corresponds to 8 states, that is, each of the cases of NDI=1 and NDI=0 corresponds to 4 states. For scheduling 8 processes, when 1 bit indicates scheduling for a single TB, the process scheduling corresponds to 16 states, that is, each of the cases of NDI=1 and NDI=0 corresponds to 8 states.

In an embodiment, the scheduling information includes 1 bit information for indicating scheduling for a single process or for multiple processes. In a case where the 1 bit information in the scheduling information indicates a scheduling for multiple processes, j bits in X−1 bits are used to indicate NDI information of j processes, and X−1−j bits in the X−1 bits are used to indicate process identification information. The process identification information is used to indicate index information of scheduled processes, or a start position of indexes of scheduled processes and process number information. The bit values of the X−1−j bits are all the same, or only one bit in the X−1−j bits has a different bit value.

In an embodiment, in a case where X=10 and Y=8, 1 bit in the 10 bits is used to indicate scheduling for multiple processes, j bits in 9 bits are used to indicate NDI information of j processes, and 9-j bits are used to indicate process identification information. The process identification information is used to indicate index information of the scheduled processes, or a start position of indexes of scheduled processes and process number information. The bit values of the 9-j bits are all the same, or only one bit therein has a different bit value.

In an embodiment, in a case where X=10, the scheduling state indicated includes one of the following.

In a case where the number of currently scheduled processes is 8, 1 bit, for process identification information, in the 9 bits is indicated as x, and 8 bits for NDI correspond to 8 processes, the 8 processes include: $x_0x_1x_2x_3x_4x_5x_6x_7$; in a case where the number of currently scheduled processes is 7, 2 bits, for process identification information, in the 9 bits are indicated as ~x, x, and 7 bits for NDI correspond to 7 processes, the 7 processes include: $x_0x_1x_2x_3x_4x_5x_6$ or $x_1x_2x_3x_4x_5x_6x_7$; in a case where the number of currently scheduled processes is 6, 3 bits, for process identification information, in the 9 bits are indicated as ~x, ~x, x, and 6 bits for NDI correspond to 6 processes, the 6 processes include $x_0x_1x_2x_3x_4x_5$, $x_1x_2x_3x_4x_5x_6$ or $x_2x_3x_4x_5x_6x_7$; in a case where the number of currently scheduled processes is 5, 4 bits, for process identification information, in the 9 bits are indicated as ~x, ~x, ~x, x, and 5 bits for NDI correspond to 5 processes, the 5 processes include: $x_0x_1x_2x_3x_4$, $x_1x_2x_3x_4x_5$, $x_2x_3x_4x_5x_6$, $x_3x_4x_5x_6x_7$; in a case where the number of currently scheduled processes is 4, 5 bits, for process identification information, in the 9 bits are indicated as ~x, ~x, ~x, ~x, x, and 4 bits for NDI correspond to 4 processes, the 4 processes include: $x_0x_1x_2x_3$, $x_1x_2x_3x_4$, $x_2x_3x_4x_5$, $x_3x_4x_5x_6$ or $x_4x_5x_6x_7$; in a case where the number of currently scheduled processes is 3, 6 bits, for process identification information, in the 9 bits are indicated as ~x, ~x, ~x, ~x, ~x, x, and 3 bits for NDI correspond to 3 processes, the 3 processes include: $x_0x_1x_2$, $x_1x_2x_3$, $x_2x_3x_4$, $x_3x_4x_5$, $x_4x_5x_6$ or $x_5x_6x_7$; in a case where the number of currently scheduled processes is 2, 7 bits, for process identification information, in the 9 bits are indicated as ~x, ~x, ~x, ~x, ~x, ~x, x, or ~x, ~x, ~x, ~x, ~x, ~x, ~x, and 2 bits for NDI correspond to 2 processes, the 2 processes include: $x_0x_1$, $x_1x_2$, $x_2x_3$, $x_3x_4$, $x_4x_5$, $x_5x_6$ or $x_6x_7$; where $x \in \{0,1\}$, ~x denotes a negative x, $x_0$, $x_1$, $x_2$, $x_3$, $x_4$, $x_5$, $x_6$, $x_7$ respectively correspond to NDI information corresponding to a process with a process identifier 0, NDI information corresponding to a process with a process identifier 1, NDI information corresponding to a process with a process identifier 2, NDI information corresponding to a process with a process identifier 3, NDI information corresponding to a process with a process identifier 4, NDI information corresponding to a process with a process identifier 5, NDI information corresponding to a process with a process identifier 6, NDI information corresponding to a process with a process identifier 7, and each of $x_0$, $x_1$, $x_2$ $x_3$, $x_4$, $x_5$, $x_6$, $x_7 \in \{0,1\}$.

For example, taking X=10 and Y=8 as an example, j bits in X−1 bits being used to indicate NDI information of the j processes and X−1−j bits being used to indicate process identification information are described. Bit values in the process identification information in this embodiment may be completely the same, or only one therein may have a different bit value. Table 3 is a table of relationship between a DCI bit index and the number of hybrid automatic repeat request (HARQ) processes according to embodiments of the present disclosure.

TABLE 3

Table of Relationship between DCI bit index and the number of HARQ Processes

| The number of HARQ processes | DCI bit index | | | | | | | | |
|---|---|---|---|---|---|---|---|---|---|
| | #0 | #1 | #2 | #3 | #4 | #5 | #6 | #7 | #8 |
| 8 HARQ processes | 1 | N(0) | N(1) | N(2) | N(3) | N(4) | N(5) | N(6) | N(7) |
| 7 HARQ processes | 0 | 1 | N(0) | N(1) | N(2) | N(3) | N(4) | N(5) | N(6) |
| 6 HARQ processes | 0 | 0 | 1 | N(0) | N(1) | N(2) | N(3) | N(4) | N(5) |
| 5 HARQ processes | 0 | 0 | 0 | 1 | N(0) | N(1) | N(2) | N(3) | N(4) |
| 4 HARQ processes | 0 | 0 | 0 | 0 | 1 | N(0) | N(1) | N(2) | N(3) |
| 3 HARQ processes | 0 | 0 | 0 | 0 | 0 | 1 | N(0) | N(1) | N(2) |
| 2 HARQ processes | 0 | 0 | 0 | 0 | 0 | 0 | 1 | N(0) | N(1) |
| 2 HARQ processes | 0 | 0 | 0 | 0 | 0 | 0 | 0 | N(6) | N(7) |

As shown in Table 3, when j is 8, 8 bits in X−1=9 bits are used to indicate NDI information of 8 processes, and X−1−j=1 bit in X−1=9 bits is used to indicate process identification information, where, a bit value of the process identification information is 1; when j is 7, 7 bits in X−1=9 bits are used to indicate NDI information of 7 processes, and X−1−j=2 bits in X−1=9 bits are used to indicate process identification information, where, bit values of the process identification information are 0 and 1 respectively, and only one bit therein has a different bit value; when j is 6, 6 bits in X−1=9 bits are used to indicate NDI information of 6 processes, and X−1−j=3 bits in X−1=9 bits are used to indicate process identification information, where, bit values of the process identification information are 0, 0 and 1 respectively, and only one bit therein has a different bit value; likewise, when j is 2, 2 bits in X−1=9 bits are used to indicate NDI information of 2 processes, and X−1−j=7 bits in X−1=9 bits are used to indicate process identification information, where, bit values of the process identification information are 0, 0, 0, 0, 0, 0 and 1 respectively or 0, 0, 0, 0, 0, 0 and 0 respectively, that is, only one bit therein has a different bit value or all bits have the same bit value. In cases where the number of the scheduled processes is less than 8, that is, the number of the scheduled processes is 1, 2, 3, 4, 5, 6, and 7, process identifiers of scheduled processes are not limited as shown in Table 3. For example, in a case where the number of the scheduled processes is 7, NDI information in table 3 represents NDI information corresponding to processes with process identifiers 0123456, and it may also be NDI information corresponding to processes with process identifiers 1234567. For scheduling of 8 processes, the method of using j bits in X−1 bit to indicate NDI information of j processes is adopted to indicate scheduling for multiple processes, the structure is simple and the flexibility is acceptable, and compared with the bitmap method of 6 bits or the joint indication method of 13 bits, the DCI overhead occupied is also small.

In an embodiment, in a case where the maximum number of processes scheduled through DCI is 4, the scheduling information X is 6 bits, where 5 bits in the 6 bits are used to indicate process identification information of multiple process scheduling and NDI information corresponding to processes, and the scheduling state indicated by the 5 bits includes at least one of the following.

In a case where the number of currently scheduled processes is 4, 1 bit, for process identification information, in the 5 bits is indicated as x, 4 bits for NDI correspond to 4 processes, the 4 processes include $x_0 x_1 x_2 x_3$; in a case where, the number of currently scheduled processes is 3, 2 bits, for process identification information, in the 5 bits are indicated as ~x, x, 3 bits for NDI correspond to 3 processes, the 3 processes include $x_0 x_1 x_2$ or $x_1 x_2 x_3$; in a case where, the number of currently scheduled processes is 2, 3 bits, for process identification information, in the 5 bits are indicated as ~x, ~x ~x or ~x, ~x, x, 2 bits for NDI correspond to 2 processes, the 2 processes include $x_0 x_1$, $x_1 x_2$ or $x_2 x_3$; where, ~x denotes negative x, and $x_0$, $x_1$, $x_2$ and $x_3$ respectively correspond to NDI information corresponding to a process with a process identifier 0, NDI information corresponding to a process with a process identifier 1, NDI information corresponding to a process with a process identifier 2 and NDI information corresponding to a process with a process identifier 3, and each of $x_0$, $x_1$, $x_2$ and $x_3 \in \{0,1\}$.

For example, taking X=6 and Y=4 as an example, j bits in X−1 bits being used to indicate NDI information of j processes and X−1−j bits being used to indicate process identification information are described. All the X−1−j bits may have the same bit value completely, or only one bit therein has a different bit value. Table 4 is a table of another relationship between the DCI bit index and the number of HARQ processes according to an embodiment of the present disclosure.

TABLE 4

Table of another relationship between DCI bit index and number of HARQ processes according to an embodiment of the present disclosure

| Number of HARQ Processes | DCI bit index | | | | |
|---|---|---|---|---|---|
| | #0 | #1 | #2 | #3 | #4 |
| 4 HARQ processes | 1 | N(0) | N(1) | N(2) | N(3) |
| 3 HARQ processes | 0 | 1 | N(0) | N(1) | N(2) |
| 2 HARQ processes | 0 | 0 | 1 | N(0) | N(1) |
| 2 HARQ processes | 0 | 0 | 0 | N(2) | N(3) |

As shown in Table 4, when j is 4, 4 bits in X−1=5 bits are used to indicate NDI information of 4 processes, and X−1−j=1 bit in the X−1=5 bits is used to indicate process identification information, where, the bit value of the process identification information is 1; when j is 3, 3 bits in X−1=5 bits are used to indicate NDI information of 3 processes, and X−1−j=2 bits in the X−1=5 bits are used to indicate process identification information, where, bit values of the process identification information are 0 and 1 respectively, and only one bit therein has a different bit value; when j is 2, 2 bits in X−1=5 bits are used to indicate NDI information of 2 processes, and X−1−j=3 bits in X−1=5 bits are used to indicate process identification information, where, bit values of the process identification information are 0, 0 and 1 respectively, and only one bit therein has a different bit value; when j is 2, 2 bits in X−1=5 bits are used to indicate NDI information of 2 processes, and X−1−j=3 bits in X−1=5 bits are used to indicate process identification information, where, bit values of the process identification information are 0, 0, 0, respectively, that is, only one bit therein has a different bit value or all bits have the same bit value. In cases where the number of the scheduled processes is less than 4, that is, the number of the scheduled processes is 1, 2, 3, and 4, process identifiers of scheduled processes are not limited as shown in Table 4. For example, in a case where the number of the scheduled processes is 3, NDI information in table 4 represents NDI information corresponding to processes with process identifiers 012, and it may also be NDI information corresponding to processes with process identifiers 123. For 4 processes, this method, compared with the joint indication scheme of 7 bits, has 1 bit saved, and ensures single process scheduling. In addition, for multiple process scheduling, the description of table 4 has a clear structure, and also ensures a certain flexibility.

In an embodiment, when the scheduling information indicates scheduling for multiple processes, the scheduling information further includes information used to indicate scheduling for a hybrid transport or for a non-hybrid transport; or, the scheduling information further includes process number identification information, where the process number identification information is used to indicate that the number of currently scheduled processes is greater than a threshold z or the number of currently scheduled processes is less than or equal to the threshold z. For example, in a case of X=11 and Y=8, where 1 bit is for a method indication, that is, in the case of scheduling for multiple TBs, 1 bit in the 11 bits for scheduling information is used to indicate scheduling for a hybrid transport and a non-hybrid transport; when it is indicated as a scheduling for a non-hybrid transport, the form of a bitmap may be used to indicate the scheduling of 8 processes; when it is indicated as a scheduling for a hybrid transport, 9 bits may be used to represent multiple processes, for the form of using 9 bits to represent multiple processes, reference may be made to the description in table 3, which is not repeated here. However, NDI information corresponding to multiple processes transmitted in a hybrid manner is not completely the same. In an embodiment, 1 bit in the X=11 bits for scheduling information is for a method indication, that is, in a case of scheduling for multiple TBs, 1 bit in the X=11 bits for scheduling information is used to indicate that the number of scheduled processes is greater than a threshold z or the number of scheduled processes is less than or equal to the threshold z. For example, in a case of the threshold z=4, 1 bit in the 11 bits for scheduling information is used to indicate scheduling for 2 to 4 process or for 5 to 8 processes. When scheduling for multiple TBs is supported, 1 bit in the scheduling information is used to distinguish a hybrid transport from a non-hybrid transport, which realizes dynamically enabling hybrid transport and non-hybrid transport. Or, in a case where scheduling for multiple TBs is supported, 1 bit in the scheduling information is used to distinguish whether or not the number of scheduled processes is greater than 4, which facilitates ensuring the fairness between services with a small amount of data and a large amount of data.

In an embodiment, in a case where X=10 and Y=8, 1 bit in the X=10 bits for scheduling information can be used to indicate scheduling for multiple processes, and then a relational expression between the value of M and the number j of the currently scheduled processes in the above embodiments can be used to express the 10 bits for scheduling information. The solution in this embodiment is used to indicate a case in which the number of scheduled processes is greater than or equal to 2. Using the relational expression between the value of M and the number j of the currently scheduled processes in the above embodiments to indicate the scheduling for multiple processes realizes the description without using a list, which is simple.

In an embodiment, 1 bit in the scheduling information is used to distinguish scheduling for a single process from scheduling for multiple processes, which is beneficial for supporting the scheduling for a single process while supporting the scheduling for multiple processes.

In an embodiment, scheduling information includes process number identification information, process identification information, and NDI information corresponding to processes, where the process number identification information is used to indicate that the number of currently scheduled processes is greater than a threshold z or the number of currently scheduled processes is less than or equal to the threshold z, and the process identification information is used to indicate index information of scheduled processes, or a start position of indexes of scheduled processes and process number information. The scheduling indication method configured in this embodiment can be used in a case where multiple shared channels is scheduled through one PDCCH, and the scheduling of the multiple processes is indicated by scheduling information. In the solution in this embodiment, X-bits for scheduling information is used to indicate scheduling of Y processes. The X-bit scheduling information may include: 1 bit for indicating whether the scheduled process is 1 to Z processes or z+1 to Y processes. Using the 1 bit in the scheduling information to distinguish between process numbers is beneficial for ensuring fairness between services of different amounts of data during data transport.

In an embodiment, the scheduling information includes process number identification information.

In a case where the process number identification information indicates that the number of currently scheduled processes is greater than a threshold z, identifiers of the scheduled processes in scheduling information are consecutive. For example, in a case of z=4, Y=8, where the process number identifier indicates that the number of currently scheduled processes is greater than 4, identifiers of the scheduled processes in the scheduling information are consecutive. For example, the identifiers of the scheduled processes may be 0123, and may also be 4567. Apparently, this is not limited, as long as the identifiers of the scheduled processes are consecutive.

In an embodiment, in a case where scheduling information includes process number identification information and the process number identification information indicates that the number of currently scheduled processes is greater than a threshold z, identifiers of the scheduled processes in the scheduling information are consecutive, and the scheduling information further includes:

In X−1 bits, j bits used to indicate NDI information of j processes, and X−1−j bits used to indicate process identification information. All of the X−1−j bits have the same bit value, or only one bit therein has a different bit value.

In an embodiment, in a case where the maximum number of scheduled processes is 8 and the scheduling information X is 10 bits, the scheduling state indicated includes one of the following.

In a case where the number of currently scheduled processes is 8, 8 bits for NDI correspond to 8 processes, the 8 processes include: $x_0x_1x_2x_3x_4x_5x_6x_7$; in a case where the number of the currently scheduled processes is 7, 7 bits for NDI correspond to 7 processes, the 7 processes include: $x_0x_1x_2x_3x_4x_5x_6$ or $x_1x_2x_3x_4x_5x_6x_7$; in a case where the number of the currently scheduled processes is 6, 6 bits for NDI correspond to 6 processes, the 6 processes include: $x_0x_1x_2x_3x_4x_5$, $x_1x_2x_3x_4x_5x_6$ or $x_2x_3x_4x_5x_6x_7$; in a case where the number of the currently scheduled processes is 5, 5 bits for NDI correspond to 5 processes, the 5 processes include: $x_0x_1x_2x_3x_4$, $x_1x_2x_3x_4x_5$, $x_2x_3x_4x_5x_6$ or $x_3x_4x_5x_6x_7$; where $x_0$, $x_1$, $x_2$, $x_3$, $x_4$, $x_5$, $x_6$, $x_7$ respectively corresponds to NDI information corresponding to a process with a process identifier 0, NDI information corresponding to a process with a process identifier 1, NDI information corresponding to a process with a process identifier 2, NDI information corresponding to a process with a process identifier 3, NDI information corresponding to a process with a process identifier 4, NDI information corresponding to a process with a process identifier 5, NDI information corresponding to a process with a process identifier 6, and NDI information corresponding to a process with a process identifier 7, and each of $x_0$, $x_1$, $x_2$, $x_3$, $x_4$, $x_5$, $x_6$, $x_7 \in \{0,1\}$.

For example, taking X=10, Y=8 and z=4 as an example, j bits in X−1 bits being used to indicate NDI information of j processes and X−1−j bits being used to indicate process identification information are described. Bit values of the process identification information may be completely the same, or only one bit may have a bit value different. Table 5 is a table of still another relationship between the DCI bit index and the number of HARQ processes according to an embodiment of the present disclosure. Where, 1 bit is used to indicate that the number of currently scheduled processes is greater than a threshold z, i.e., indicating process scheduling for 5-8 processes.

TABLE 5

Table of still another relationship between DCI bit index and number of
HARQ processes according to an embodiment of the present disclosure

| Number of | DCI bit index | | | | | | | | |
|---|---|---|---|---|---|---|---|---|---|
| HARQ processes | #0 | #1 | #2 | #3 | #4 | #5 | #6 | #7 | #8 |
| 8 HARQ processes | 1 | N(0) | N(1) | N(2) | N(3) | N(4) | N(5) | N(6) | N(7) |
| 7 HARQ processes | 0 | 1 | N(0) | N(1) | N(2) | N(3) | N(4) | N(5) | N(6) |
| 6 HARQ processes | 0 | 0 | 1 | N(0) | N(1) | N(2) | N(3) | N(4) | N(5) |
| 5 HARQ processes | 0 | 0 | 0 | 1 | N(0) | N(1) | N(2) | N(3) | N(4) |
| 5 HARQ processes | 0 | 0 | 0 | 0 | N(3) | N(4) | N(5) | N(6) | N(7) |

As shown in Table 5, in a case where the number of currently scheduled processes is 8, 8 bits in 10−1=9 bits are used to indicate NDI information of the 8 processes, and 10−1−8=1 bit is used to indicate process identification information; in a case where the number of the currently scheduled processes is 7, 7 bits in 10−1=9 bits are used to indicate NDI information of the 7 processes, and 10−1−7=2 bits are used to indicate process identification information; by analogy, in a case where the number of the currently scheduled processes is 5, 5 bits in 10−1=9 bits are used to indicate NDI information of the 5 processes, and 10−1−5=4 bits are used to indicate process identification information; for example, the process identification information may be 0001 or 0000, that is, bit values in the process identification information are all the same, or only one bit therein has a different bit value.

In an embodiment, in a case where the maximum number of scheduled processes is 4, the scheduling state corresponding to the scheduling information includes at least one of the following.

In a case where the number of currently scheduled processes is 4, the number of the scheduling state includes sixteen $x_0x_1x_2x_3$; in a case where the number of the currently scheduled processes is 3, the number of the scheduling state includes eight $x_0x_1x_2$ and eight $x_1x_2x_3$, where, $x_0$, $x_1$, $x_2$ and $x_3$ respectively correspond to NDI information corresponding to a process with a process identifier 0, NDI information corresponding to a process with a process identifier 1, NDI information corresponding to a process with a process identifier 2, NDI information corresponding to a process with a process identifier 3, and each of $x_0$, $x_1$, $x_2$ and $x_3 \in \{0,1\}$.

In an embodiment, the scheduling information includes process number identification information. In a case where the process number identification information indicates that the number of currently scheduled processes is less than or equal to a threshold z, the process identification information further includes information about process group of scheduled processes and process identification information within a process group, where the process identification information within the process group and the NDI information of the scheduled processes are jointly indicated or separately indicated.

In an embodiment, in a case where the maximum number of scheduled processes is 8, z=4, and X=10, 1 bit in scheduling information is used to indicate that information about process group of scheduled processes is processes 0123 or processes 4567, 4 bits in the remaining 8 bits indicate in a bitmap positions and number of 4 processes, and other 4 bits are used to indicate NDI of 4 processes; or in a case where the maximum number of scheduled processes is 8 and z=4, 2 bits in the scheduling information are used to indicate information about process group of scheduled processes is processes 0123, processes 2345, processes 4567, or processes 6710, and the remaining 7 bits are used to jointly indicate process identification information within the process group and the NDI information of the scheduled processes.

In an embodiment, in a case of Y=8, z=4 and X=10, 1 bit in the scheduling information indicates scheduling for processes of 1 to 4 or scheduling for processes of 5 to 8. In a case where 1 bit in the scheduling information indicates scheduling for processes of 1 to 4, a further 1 bit is used to indicate scheduling for processes 0123 or for processes 4567, and 4 bits in remaining 8 bits indicate in a bitmap manner positions and number of 4 processes, and other 4 bits are used to indicate NDI information of the 4 processes.

Alternatively, in a case where the maximum number of scheduled processes is 8 and z=4, 2 bits in the scheduling information are used to indicate information of process group of scheduled processes, that is, to indicate positions of selected 4 processes, for example, processes of 0123, 4567, 0167, or 2345, and then the remaining 7 bits are used to indicate hybrid transport of the 4 processes (including 50 hybrid transport states and 30 non-hybrid transport states). The 7 bits may be used to indicate the process positions, process number of the 4 processes, and NDI information corresponding to the processes in a joint indication manner.

In an embodiment, 1 bit in the scheduling information is used to indicate that the number of currently scheduled processes is greater than a threshold z or the number of currently scheduled processes is less than or equal to the threshold z. In a case where the maximum number of scheduled processes is 4 and z=2, the scheduling state corresponding to the scheduling information includes one of the following.

In a case where the number of the currently scheduled processes is 1, the number of the scheduling state includes two $x_0$, two $x_1$, two $x_2$ and two $x_3$.

In a case where the number of the currently scheduled processes is 2, the number of the scheduling state includes four $x_0x_1$, four $x_1x_2$, four $x_2x_3$, four $x_1x_3$, four $x_0x_3$ and four $x_0x_2$.

In a case where the number of the currently scheduled processes is 4, the number of the scheduling state includes sixteen $x_0x_1x_2x_3$.

In a case where the number of the currently scheduled processes is 3, the number of the scheduling state includes eight $x_0x_1x_2$ or eight $x_1x_2x_3$.

Where, $x_0$, $x_1$, $x_2$ and $x_3$ respectively correspond to NDI information corresponding to a process with a process identifier 0, NDI information corresponding to a process with a process identifier 1, NDI information corresponding to a process with a process identifier 2 and NDI information corresponding to a process with a process identifier 3, and each of $x_0$, $x_1$, $x_2$ and $x_3 \in \{0,1\}$.

In an embodiment, in a case where Y=4, z=2, 1 bit in the scheduling information is used to indicate scheduling for 1 to 2 processes, or scheduling for 3 to 4 processes. For example, in a case where X=6, Y=4 and z=2, 1 bit is used to distinguish between a scheduling for within 2 processes, a scheduling for 3 processes and a scheduling for 4 processes. When it is indicated as a scheduling for 3 processes and 4 processes, 5 bits are used for indication. When it is a scheduling for 4 processes (for example, 0123), the scheduling state includes 16 states; and when it is a scheduling for 3 processes (for example, 012 and 123), the scheduling state includes 2*8=16 states. Therefore, 5 bits can be used to indicate. When it is indicated as a scheduling for 1 process and 2 processes, the scheduling state for scheduling for a single process includes 8 scheduling states, and the scheduling state for a scheduling for two processes (for example, 01, 23, 02, 13, 03 and 12) includes 24 scheduling states, totaling 32 states. 5 bits may be used for indication in this case. Using 1 bit for distinguishing can better ensure fairness between services with a small number of processes and a large number of processes.

In an embodiment, the scheduling information includes information for indicating scheduling for a hybrid transport or a non-hybrid transport, and process identification information, and NDI information corresponding to processes, where the non-hybrid transport scheduling refers to that scheduled processes correspond to same NDI information, the hybrid transport scheduling refers to that scheduled processes correspond to not completely the same NDI information, and the process identification information is used to indicate index information of scheduled processes, or a start position of indexes of scheduled processes and process number information. The scheduling indication method configured in this embodiment can be used in a case where multiple shared channels is scheduled through one PDCCH and the scheduling for multiple processes are indicated by scheduling information. In the solution according to this embodiment, X-bits are used to indicate scheduling of Y processes. The X-bit scheduling information may include 1 bit for indicating that the process scheduling method is of a non-hybrid transport scheduling or a hybrid transport scheduling.

In an embodiment, in a case where the scheduling information is indicated as a non-hybrid transport scheduling, process positions and process number are indicated in a form of bitmap, and the scheduled processes correspond to the same NDI information, and the NDI information is indicated by 1 bit.

In an embodiment, in a case where the scheduling information is indicated as a hybrid transport scheduling, process identifiers of the scheduled processes in the scheduling information are consecutive, and each scheduled process has a corresponding 1 bit for NDI information.

In an embodiment, in a case where the maximum number of scheduled processes is 8, the scheduling information X is 10 bits; or, in a case where the maximum number of scheduled processes is 4, the scheduling information is 6 bits.

In an embodiment, in a case where the maximum number of scheduled processes is 4, the scheduling information is 6 bits. For example, in a case where X=6 and Y=4, when 4 processes are scheduled, the processes are scheduled as 0123, the scheduling state includes 14 hybrid transport states, for example, the NDI corresponding to the 14 hybrid transport states is indicated as 0001, 0010, 0100, 1000, 0011, 0101, 1001, 1010, 1100, 0110, 0111, 1110, 1011 and 1101. When 3 processes are scheduled, the processes are scheduled as 012 and 123, the hybrid transport state includes 12 states, for example, each process correspondingly has 4 states of 001, 010, 100, and 110. When 2 processes are scheduled, the processes are scheduled as 01, 12, and 23, the hybrid transport state includes 6 states, that is, the total number of hybrid transport states is 32, and the 32 states can be indicated by 5 bits.

In an embodiment, in a case where X=10 and Y=8, the scheduling information X is 10 bits, and the configuring method of table 6 or table 7 may be used for scheduling indication. Table 6 is a table of another relationship between the DCI bit index and the number of HARQ processes according to an embodiment of the present disclosure. Table 7 is a table of still another relationship between the DCI bit index and the number of HARQ processes according to an embodiment of the present disclosure.

TABLE 6

Table of another relationship between DCI bit index and number of HARQ processes according to an embodiment of the present disclosure

| Number of HARQ-processes | DCI bit index | | | | | | | | |
|---|---|---|---|---|---|---|---|---|---|
| | #0 | #1 | #2 | #3 | #4 | #5 | #6 | #7 | #8 |
| 8 HARQ processes | 1 | N(0) | N(1) | N(2) | N(3) | N(4) | N(5) | N(6) | N(7) |
| 7 HARQ processes | 0 | 1 | N(0) | N(1) | N(2) | N(3) | N(4) | N(5) | N(6) |
| 6 HARQ processes | 0 | 0 | 1 | N(0) | N(1) | N(2) | N(3) | N(4) | N(5) |
| 5 HARQ processes | 0 | 0 | 0 | 1 | N(0) | N(1) | N(2) | N(3) | N(4) |
| 4 HARQ processes | 0 | 0 | 0 | 0 | 1 | N(0) | N(1) | N(2) | N(3) |
| 4 HARQ processes | 0 | 0 | 0 | 0 | 0 | N(4) | N(5) | N(6) | N(7) |

TABLE 7

Table of still another relationship between DCI bit index and number of HARQ processes according to an embodiment of the present disclosure

| Number of HARQ processes | DCI bit index | | | | | | | | |
|---|---|---|---|---|---|---|---|---|---|
| | #0 | #1 | #2 | #3 | #4 | #5 | #6 | #7 | #8 |
| 8 HARQ processes | 1 | N(0) | N(1) | N(2) | N(3) | N(4) | N(5) | N(6) | N(7) |
| 7 HARQ processes | 0 | 1 | N(0) | N(1) | N(2) | N(3) | N(4) | N(5) | N(6) |

TABLE 7-continued

Table of still another relationship between DCI bit index and number of HARQ processes according to an embodiment of the present disclosure

| Number of HARQ processes | DCI bit index | | | | | | | | |
|---|---|---|---|---|---|---|---|---|---|
| | #0 | #1 | #2 | #3 | #4 | #5 | #6 | #7 | #8 |
| 6 HARQ processes | 0 | 0 | 1 | N(0) | N(1) | N(2) | N(3) | N(4) | N(5) |
| 5 HARQ processes | 0 | 0 | 0 | 1 | N(0) | N(1) | N(2) | N(3) | N(4) |
| 4 HARQ processes | 0 | 0 | 0 | 0 | 1 | N(0) | N(1) | N(2) | N(3) |
| 3 HARQ processes | 0 | 0 | 0 | 0 | 0 | 1 | N(0) | N(1) | N(2) |
| 2 HARQ processes | 0 | 0 | 0 | 0 | 0 | 0 | 1 | N(0) | N(1) |
| 2 HARQ processes | 0 | 0 | 0 | 0 | 0 | 0 | 0 | N(6) | N(7) |

The process scheduling states in table 6 and table 7 are different from each other in their corresponding NDI information. 1 bit in the scheduling information is used to distinguish a hybrid transport from a non-hybrid transport, which can dynamically enable hybrid transport and ensure fairness between hybrid transport states and non-hybrid transport states, and in addition, compared with manners of the bitmap or the joint indication for all states, the DCI size is reduced.

In a case of scheduling for multiple TBs, for transport of services with a large volume of data, the MCS domain and the resource allocation domain may be compressed to reduce the DCI size.

In an embodiment, the scheduling indication method further includes: indicating an MCS domain of the multiple shared channels, where an MCS domain corresponding to a case of scheduling for multiple shared channels enabled is 1 bit less than an MCS domain corresponding to a case of scheduling for multiple shared channels disabled. In a case where a first mode is adopted, indexes of the MCS domain when scheduling for the multiple shared channels enabled are odd indexes or even indexes of indexes $I_{MCS}$ of the MCS domain when scheduling for the multiple shared channels disabled.

In an embodiment, the MCS domain is compressed to reduce the DCI size, and the DCI size is reduced as much as possible on the premise that a certain flexibility is ensured, so as to avoid the problem of too large DCI size caused by scheduling multiple through one.

Table 8 is a table of relationship between transport block size (TBS) domain indexes and MCS domain indexes in a CE mode A and a CE mode B of PDSCH. Table 9 is a table of another relationship between TBS domain indexes and MCS domain indexes in a CE mode A and a CE mode B of PDSCH.

TABLE 8

Table of relationship between TBS domain index and MCS domain index in CE mode A and CE mode B of PDSCH

| Index $I_{MCS}$ of MCS Domain | Index $I_{TBS}$ of TBS domain |
|---|---|
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | 9 |
| 11 | 10 |
| 12 | 11 |
| 13 | 12 |
| 14 | 13 |
| 15 | 14 |

As shown in Table 8, the MCS domain index is denoted by $I_{MCS}$, and the TBS domain index is denoted by $I_{TBS}$. Where indexes $I_{MCS}$ of 0-15 correspond to the CE mode A, and indexes $I_{MCS}$ of 0-9 correspond to the CE mode B.

TABLE 9

Table of another relationship between TBS Domain Index and MCS domain index in CE mode A and CE mode B of PDSCH

| Index $I_{MCS}$ of MCS domain | Index $I_{TBS}$ of TBS domain |
|---|---|
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | 10 |
| 11 | 10 |
| 12 | 11 |
| 13 | 12 |
| 14 | 13 |
| 15 | 14 |

As shown in Table 9, the MCS domain index is denoted by $I_{MCS}$, and the TBS domain index is denoted by $I_{TBS}$. Where indexes $I_{MCS}$ of 0-15 correspond to the CE mode A, and indexes $I_{MCS}$ of 0-9 correspond to the CE mode B.

For each of uplink and downlink transports in CE mode A, the MCS domain thereof is 4 bits. In an embodiment, if the MCS domain for the downlink CE mode A is compressed to 3 bits, the compression scheme is $I_{MCS}=2n+1$, and a value of n is in 0~7. Table 10 is a schematic table of compressing an MCS domain in the mode A to 3 bits according to an embodiment of the present disclosure.

TABLE 10 schematic Table of compressing MCS domain in Mode A to 3 bits according to an embodiment of the present disclosure

| New Index of MCS Domain | Index $I_{MCS}$ of MCS domain | Index $I_{TBS}$ of TBS domain |
| --- | --- | --- |
| 0 | 1 | 1 |
| 1 | 3 | 3 |
| 2 | 5 | 5 |
| 3 | 7 | 7 |
| 4 | 9 | 9 |
| 5 | 11 | 10 |
| 6 | 13 | 12 |
| 7 | 15 | 14 |

As shown in the table 10, the MCS domain when scheduling for the multiple shared channels enabled is one bit less than the MCS domain when scheduling for the multiple shared channels disabled. In a case where the CE mode A is adopted, indexes $I_{MCS}$ of the MCS domain when scheduling for the multiple shared channels enabled are odd indexes of indexes $I_{MCS}$ of the MCS domain when scheduling for the multiple shared channels disabled, that is, $I_{MCS}$ is 1, 3, 5, 7, 9, 11, 13 and 15. Correspondingly, the new indexes of MCS domain in the table 10 are selected from values of indexes $I_{MCS}$ of the original MCS domain and are renumbered, i.e., the new indexes are 0~7.

In an embodiment, the MCS domain of the downlink CE mode A is compressed to 3 bits. The compression scheme may be $I_{MCS}=2n$, n is 0~7. Table 11 is another schematic table of compressing the MCS domain in mode A to 3 bits according to an embodiment of the present disclosure.

TABLE 11

Another schematic table of compressing MCS domain in CE mode A to 3 bits according to an embodiment of the present disclosure

| New Index of MCS Domain | Index $I_{MCS}$ of MCS domain | Index $I_{TBS}$ of TBS domain |
| --- | --- | --- |
| 0 | 0 | 0 |
| 1 | 2 | 2 |
| 2 | 4 | 4 |
| 3 | 6 | 6 |
| 4 | 8 | 8 |
| 5 | 10 | 9 |
| 6 | 12 | 11 |
| 7 | 14 | 13 |

As shown in Table 11, the MCS domain when scheduling for the multiple shared channels enabled is one bit less than the MCS domain when scheduling for the multiple shared channels disabled.

In a case where the CE mode A is adopted, indexes $I_{MCS}$ of the MCS domain when scheduling for the multiple shared channels enabled are even indexes of indexes $I_{MCS}$ of the MCS domain when scheduling for the multiple shared channels disabled, that is, $I_{MCS}$ is 0, 2, 4, 6, 8, 10, 12 and 14. Correspondingly, the new indexes of the MCS domain in Table 11 are selected from values of indexes $I_{MCS}$ of the original MCS domain and are renumbered, i.e., the new indexes are 0~7.

In an embodiment, for the scheme of compressing uplink mode A from 4 bits to 3 bits, the methods in Table 10 and Table 11 may also be applied thereto, which are not redescribed here one by one.

In an embodiment, the scheduling indication method further includes indicating a modulation coding scheme MCS domain of the multiple shared channels, and the MCS domain when scheduling for the multiple shared channels enabled is one bit less than an MCS domain when scheduling for the multiple shared channels disabled. In a case where a second mode is adopted, indexes of the MCS domain when scheduling for the multiple shared channels enabled are preset consecutive indexes of the MCS domain when scheduling for the multiple shared channels disabled, or the indexes of the MCS domain when scheduling for the multiple shared channels enabled include preset consecutive indexes and D preset indexes of the MCS domain when scheduling for the multiple shared channels disabled.

In an embodiment, for downlink mode B or uplink mode B, an MCS domain can be compressed to 3 bits according to the method of $2<=I_{MCS}<=9$. Table 12 is a schematic table of compressing the MCS domain in mode B to 3 bits according to an embodiment of the present application.

TABLE 12

Schematic Table of compressing MCS domain of Mode B to 3 Bits according to an embodiment of the present disclosure

| New Index of MCS Domain | Index $I_{MCS}$ of MCS domain | Index $I_{TBS}$ of TBS domain |
| --- | --- | --- |
| 0 | 2 | 2 |
| 1 | 3 | 3 |
| 2 | 4 | 4 |
| 3 | 5 | 5 |
| 4 | 6 | 6 |
| 5 | 7 | 7 |
| 6 | 8 | 8 |
| 7 | 9 | 9 |

As shown in Table 12, the MCS domain when scheduling for the multiple shared channels enabled is one bit less than the MCS domain when scheduling for the multiple shared channels disabled.

In a case where the CE mode B is adopted, indexes $I_{MCS}$ of the MCS domain when scheduling for the multiple shared channels enabled are preset consecutive indexes of the MCS domain when scheduling for the multiple shared channels disabled, that is, $I_{MCS}$ is 2, 3, 4, 5, 6, 7, 8 and 9. Correspondingly, the new indexes of the MCS domain in Table 12 are selected from values of indexes $I_{MCS}$ of the original MCS domain and are renumbered, i.e., the new indexes are 0~7.

In an embodiment, in downlink mode B or uplink mode B, an MCS domain can be compressed to 3 bits according to the method of $I_{MCS}$ including a minimum value. Table 13 is another schematic table of compressing the MCS domain in mode B to 3 bits according to an embodiment of the present application.

TABLE 13

Another Schematic Table of compressing MCS domain in Mode B to 3 bits according to an embodiment of the present disclosure

| New Index of MCS Domain | Index $I_{MCS}$ of MCS domain | Index $I_{TBS}$ of TBS domain |
| --- | --- | --- |
| 0 | 0 | 0 |
| 1 | 2 | 2 |
| 2 | 4 | 4 |
| 3 | 5 | 5 |
| 4 | 6 | 6 |
| 5 | 7 | 7 |
| 6 | 8 | 8 |
| 7 | 9 | 9 |

As shown in Table 13, the MCS domain when scheduling for the multiple shared channels enabled is one bit less than the MCS domain when scheduling for the multiple shared channels disabled.

In a case where the CE mode B is adopted, indexes $I_{MCS}$ the MCS domain when scheduling for the multiple shared channels enabled are preset consecutive indexes and a minimum index of the MCS domain when scheduling for the multiple shared channels disabled, that is, $I_{MCS}$ is 0, 2, 4, 5, 6, 7, 8 and 9. Correspondingly, the new indexes of the MCS domain in Table 13 are selected from values of indexes $I_{MCS}$ of the original MCS domain and are renumbered, i.e., the new indexes are 0~7.

In an embodiment, the scheduling indication method further includes; indicating an MCS domain of the multiple shared channels, the MCS domain when scheduling for the multiple shared channels enabled is two bits less than the MCS domain when scheduling for the multiple shared channels disabled. Indexes $I_{MCS}$ of the MCS domain when scheduling for the multiple shared channels enabled are selected from indexes of the MCS domain when scheduling for the multiple shared channels disabled, where the principle of the selection is $I_{MCS}$=P*n+Q, P, Q and n are all integers, $I_{MCS}$ is an integer with a value range from 0 to 15.

In an embodiment, in a case where P=2, $I_{MCS}$=2n+Q, the value of Q is at least one of: 1, 3, 5, 7, 9; or in a case where P=3, $I_{MCS}$=3n+Q, the value of Q is at least one of: −3, 0, 3, 6 and 9; or in a case where P=4, $I_{MCS}$=4n+Q, the value of Q is at least one of: −1, 3, 7; or, in a case where P=5, the value of Q is 0, $I_{MCS}$=5n.

In an embodiment, an MCS domain is 4 bits for each of uplink and downlink transports in CE mode A. In an embodiment, in the downlink CE mode A, the MCS domain is compressed to 2 bits, and the compression scheme is: in a case where P=2, Q may be 9, i.e., $I_{MCS}$=2n+9, the value of n ranges from 0 to 3; or Q may be 7, i.e., $I_{MCS}$=2n+7, the value of n is 1~4; or Q may be 5, i.e., $I_{MCS}$=2n+5, the value of n ranges from 2 to 5; or Q may be 3, that is, $I_{MCS}$=2n+3, the value of n ranges from 3 to 6; or Q may be 1, i.e., $I_{MCS}$=2n+1, the value of n ranges from 4 to 7.

In an embodiment, in a case where P=3, $I_{MCS}$=3n+Q, the value of Q is at least one of: −3, 0, 3, 6 and 9; in a case where Q takes a different value, the corresponding value range of n is also different, for example, when Q=3, $I_{MCS}$=3n+3, the value of n ranges from 1 to 4, in a case where Q=6, $I_{MCS}$=3n+6 the value of n ranges from 0 to 3.

In an embodiment, in a case where P=4, $I_{MCS}$=4n+Q, the value of Q is at least one of: −1, 3, 7; or in a case where Q takes a different value, the corresponding value range of n is also different, for example, when Q=−1, $I_{MCS}$=4n−1, the value of n ranges from 1 to 4; when Q=3, $I_{MCS}$=4n+3, the value of n ranges from 0 to 3.

In an embodiment, in a case where P=5, Q is 0, $I_{MCS}$=5n, and the value of n ranges from 0 to 3.

In an embodiment, an MCS domain is 4 bits in each of uplink and downlink transports in CE mode B. In an embodiment, in the downlink CE mode B, the MCS domain is compressed to 2 bits, and the compression scheme is: $I_{MCS}$=2n+3, the value of n ranges from 0 to 3, or the compression scheme is written as $I_{MCS}$=2n+1, the value of n ranges from 1 to 4; or the compression scheme is written as $I_{MCS}$=3n, the value of n ranges from 0 to 3, or the compression scheme is written as $I_{MCS}$=3n−3, the value of n ranges from 1 to 4.

The indexes of the MSC domain are selected at different intervals, thus the distances between the obtained MCSs are different, i.e., flexibilities are different. When the distance is larger, the number of MSC states is smaller, and the flexibility is lower, and more DCI overhead is saved. Since scheduling for multiple processes may cause excessively large of DCI size, and for scheduling for multiple TBs, the data volume is larger compared with the scheduling for a single TB, thus, the method of MCS compression is adopted to adapt to the scheduling for multiple TB s, which can reduce the DCI size, and guarantee PDCCH performance.

In an embodiment, a resource allocation domain of a first mode can be indicated, and a resource allocation domain of a second mode can also be indicated.

The first mode may be the CE mode A. For the CE mode A, the resource allocation domain contains 5 bits, and the number of allocated physical resource blocks (PRB) is 1 to 6. In a case of scheduling for multiple TBs, in order to achieve the effect of transport of a large volume of data, 5 bits can be saved. In this case, it is required to compress the resource allocation domain to 0 bit, that is, the number of PRBs should be 6. For example, if the identifiers of the PRBs are 0, 1, 2, 3, 4, 5, the scheduling state includes a state of 6 PRBs being scheduled, which is {0,1,2,3,4,5}.

In an embodiment, the scheduling indication method further includes indicating a resource allocation domain of the multiple shared channels. In a case where the first mode is adopted, the resource allocation domain occupies one bit, and includes a state in which the number of corresponding physical resource blocks PRBs is 6 and a state in which the number of corresponding physical resource blocks PRBs is 4. In a case where the resource allocation domain occupies one bit, that is, in a case where 4 bits are saved, the bits occupied by the resource allocation domain are required to be compressed to 1 bit, and in this case, the resource allocation domain may include 2 scheduling states, that is, a state in which the number of PRBs is 6 and a state in which the number of PRBs is 4. When the number of PRBs is 4, the scheduling state may be {0,1,2,3}.

In an embodiment, the scheduling indication method further includes: indicating a resource allocation domain of the multiple shared channels. In a case where the first mode is adopted, the resource allocation domain occupies two bits, three bits, or four bits and includes a state of {0,1,2,3,4,5} in which all 6 PRBs are scheduled. In an embodiment, when to compress the resource allocation domain, the scheduling states of the compressed resource allocation domain are required to include at least the state in which 6 PRBs are scheduled, where {0,1,2,3,4,5} represents that the PRBs with identifiers 0, 1, 2, 3, 4, 5 in the narrow band are used when being scheduled.

In an embodiment, a resource allocation domain of the multiple shared channels is indicated that, in a case where the first mode is adopted, the resource allocation domain occupies two bits, and includes one of the following scheduling states: {0,1,2,3,4,5}, {0,1,2}, {3,4}, {5}; or {0,1,2,3, 4,5}, {0,1,2,3}, {4}, {5}; or {0,1,2,3,4,5}, {0,1,2,3}, {4,5}, {5}. In an embodiment, in a case where three bits are saved, the bits occupied by the resource allocation domain are required to be compressed to 2 bits, and the resource allocation domain includes 4 scheduling states, and the numbers of PRBs corresponding to the scheduling states may be different; In a case where the numbers of PRBs corresponding to scheduling states are the same, the PRB identifiers of the scheduled PRBs in the scheduling states are complementary.

In an embodiment, a resource allocation domain of multiple shared channels is indicated that, in a case where the first mode is adopted, the resource allocation domain occupies three bits, and includes one of the following scheduling states: {0,1,2,3,4,5}, {0,1,2,3,4}, {0,1,2,3}, {0,1,2}, {4,5}, {3}, {4}, {5}; or, {0,1,2,3,4,5}, {0,1,2,3,4}, {0,1,2,3}, {0,1, 2}, {3,4,5}, {0,1}, {2,3}, {4,5}; where, {0,1,2,3,4,5} indicates that PRBs with identifiers 0, 1, 2, 3, 4, 5 in the narrow band are all occupied when being scheduled. In an embodiment, in a case where 2 bits are saved, the bits occupied by the resource allocation domain are required to be compressed to 3 bits, and the resource allocation domain may include 8 states, the 8 states include at least a state in which the number of PRBs is 6. In an embodiment, 8 scheduling states are {0,1,2,3,4,5}, {0,1,2,3,4}, {0,1,2,3}, {0,1,2}, {4,5}, {3}, {4}, {5}; in the 8 scheduling states, scheduling states corresponding to 2 PRBs and 4 PRBs are complementary; a scheduling state corresponding to 3 PRBs and three scheduling states corresponding to a single PRB are complementary, and a scheduling state corresponding to 5 PRBs and a scheduling state corresponding to a single PRB (i.e., {5}) are complementary. The complementary here means the set composed of the PRBs is a full set of 6 PRBs, and there is no intersection set, such that the scheduling for various numbers of PRBs can be guaranteed, and for 6 PRBs, at most 4 UEs can be scheduled. A single PRB refers to that the number of PRB is 1, 2 PRBs refers to that the number of PRBs is 2, 3 PRBs refers to that the number of PRBs is 3, 4 PRBs refers to that the number of PRBs is 4, and 5 PRBs refers to that the number of PRBs is 5. In an embodiment, 8 scheduling states are {0,1,2,3,4,5}, {0,1,2, 3,4}, {0,1,2,3}, {0,1, 2}, {3,4,5}, {0,1}, {2,3}, {4,5}; a case in which a single PRB is scheduled is not included in these 8 scheduling states, that is, in a scenario of large TBS, and transport of a large volume of data, the number of PRBs is greater than or equal to 2. In order to ensure the UE coverage, three states of 2 PRBs are complementary, two states of 3 PRBs are complementary, and one state of 4 PRBs and one state of 2 PRBs are complementary.

In an embodiment, a resource allocation domain of the multiple shared channels is indicated that, in a case where the first mode is adopted, the resource allocation domain occupies 4 bits, and includes at least one of the following scheduling states: {0,1,2,3,4,5}, {0,1,2,3,4}, {0,1,2,3}, {0,1, 2}, {3,4,5}, {0,1}, {2,3}, {4,5}, {0}, {1}, {2}, {3}, {4}, {5}, {1,2,3,4,5}, {2,3,4,5}.

In an embodiment, in a case where 1 bit is saved, the bits occupied by the resource allocation domain are required to be compressed to 4 bits, the resource allocation domain can include 16 scheduling states, and the 16 scheduling states include at least a state in which the number of PRBs is 6. In an embodiment, 16 scheduling states may include: {0,1,2, 3,4,5}, {0,1,2,3,4}, {0,1,2,3}, {0,1,2}, {3,4,5}, {0,1}, {2,3}, {4,5}, {0}, {1}, {2}, {3}, {4}, {5}, {1,2,3,4,5}, {2,3,4,5}.

When to indicate resource allocation domain of the multiple shared channels, it should try to ensure that the states indicated for PRBs have a complementary effect, for example, {0, 1, 2} and {3, 4, 5} are complementary, that is, it should try to ensure that the states of PRBs do not overlap, to facilitate resource scheduling.

In an embodiment, a resource allocation domain of the multiple shared channels is indicated that, in a case where the second mode is adopted, the resource allocation domain occupies one bit, includes a scheduling state in which the number of corresponding PRBs is 1 and a scheduling state in which the number of corresponding PRBs is 2. In the downlink CE mode B, 1 bit can be used to indicate 4 PRBs and 6 PRBs. When to compress the resource allocation domain, the compressed resource allocation domain is required to ensure that the scheduling state of scheduling 6 PRBs can be adopted.

In an embodiment, a resource allocation domain of multiple shared channels is indicated that, in a case where the second mode is adopted, the resource allocation domain occupies two bits, and includes a scheduling state in which the number of corresponding PRBs is 2 and a scheduling state in which the number of corresponding PRBs is 1, and the scheduling states include one of the following: {4}, {5}, 10,11, {2,3}.

In an uplink CE mode B, in the related art, 3 bits may be used for indication. Table 14 is a table of relationship between a resource allocation domain and an allocated resource block.

TABLE 14

Table of relationship between resource allocation domain and allocated resource block

| Value of Resource Allocation Domain | Number of Allocated Resource Block |
| --- | --- |
| '000' | 0 |
| '001' | 1 |
| '010' | 2 |
| '011' | 3 |
| '100' | 4 |
| '101' | 5 |
| '110' | $n_{RB}$ (and) $n_{RB} + 1$ |
| '111' | $n_{RB} + 2$ and $+ n_{RB} + 3$ |

As shown in Table 14, in the uplink CE mode B, the resource allocation domain occupies 3 bits. When to indicate the resource allocation domain of the multiple shared channels, the bits occupied by the resource allocation domain can be compressed. In an embodiment, in a case where 2 bits are used for indication, scheduling states {4} {5} {0,1} {2,3} can be adopted, thereby ensuring UE coverage and scheduling and transport for multiple TBs, and 4 UEs can be scheduled. In an embodiment, in a case where 1 bit is used for indication, scheduling states {0,1} {2} or {2, 3} {1} or {0, 1} {2, 3} can be adopted.

In an embodiment, in a case of scheduling for multiple TBs in MTC, gap insertion can be supported. In an embodiment, the solution of the embodiment may be applied in a case where multiple shared channels are scheduled through one PDCCH, and multiple processes are interleaved and non-interleaved, to determine positions of gaps so as to insert the gaps. In a case where multiple processes are interleaved, gap insertion can increase time domain diversity gain.

Inserting gaps between the interleaved blocks can avoid damaging the integrity of the interleaved blocks, ensure fairness between the TBs, and facilitate early termination. In an embodiment, the inserting positions of gaps may be determined based on the interleaved blocks, and the inserting positions of gaps may also be determined based on the total length.

In a case where a radio resource control (RRC) is configured to insert a gap after Θ subframes, it cannot ensure that the position of the gap is between interleaved blocks. In an embodiment, the position of the interleaved block is after $m*G*N_{TB}$ subframes. Where, m represents the m-th interleaved block, G represents the interleaving granularity, and $N_{TB}$ represents the number of currently scheduled TBs. The value range of m is $1<=m<=R/G$, R is the number of repeat times of TBs, and R/G is the number of interleaved blocks.

In an embodiment, the scheduling indication method further includes: determining positions of gaps, where, a gap is inserted every first preset subframes, the number of the first preset subframes is determined according to an interleaving granularity of the transport blocks TBs, the number of currently scheduled TBs, and a preset threshold value, and the number of the first preset subframes is calculated through the following formular:

$$G*N_{TB}*\left\lceil\frac{\Theta}{G*N_{TB}}\right\rceil, \text{ or } G*N_{TB}*\left\lfloor\frac{\Theta}{G*N_{TB}}\right\rfloor$$

where, G is the interleaving granularity, $N_{TB}$ represents the number of currently scheduled TBs, the value range of m is $1<=m<=R/G$, R is the number of repeat times of TBs, $\Theta$ is the preset threshold, R/G is the number of interleaved blocks, $\lceil\ \rceil$ is round up, $\lfloor\ \rfloor$ is round down. The positions of gaps are determined based on the solution of the interleaved blocks, the gaps are respectively inserted between the interleaved blocks, and a gap is inserted every a certain number of subframes. Moreover, the number of the gaps varies according to the total length. Where, a gap is inserted every $$G*N_{TB}*\left\lceil\frac{\Theta}{G*N_{TB}}\right\rceil$$

subframes, or a gap is inserted every $$G*N_{TB}*\left\lfloor\frac{\Theta}{G*N_{TB}}\right\rfloor$$

subframes. For example, in a case where G=1, $N_{TB}$7, $\Theta$=32 and R=32, $$G*N_{TB}*\left\lceil\frac{\Theta}{G*N_{TB}}\right\rceil$$

=35, that is, a gap is inserted every 35 subframes, which is equivalent to inserting a gap after 5 interleaved blocks, and totaling 32 interleaved blocks. For another example, in a case where G=16, $N_{TB}$=3, ι=64, R=512, $$G*N_{TB}*\left\lceil\frac{\Theta}{G*N_{TB}}\right\rceil = 96,$$

that is, a gap is inserted every 96 subframes, which is equivalent to inserting a gap after 2 interleaved blocks. Again for example, in a case where G=16, $N_{TB}$=3, $\Theta$=32, R=512, $$G*N_{TB}*\left\lceil\frac{\Theta}{G*N_{TB}}\right\rceil = 48,$$

that is, a gap is inserted every 48 subframes, which is equivalent to inserting a gap after 1 interleaved block.

In an embodiment, the scheduling indication method further includes: determining positions of gaps, where a gap is inserted every second preset subframes, the number of the second preset subframes is determined according to the number of currently scheduled TBs, the number of repeat times of TBs, and the number of the inserted gaps. The number of the second preset subframes is calculated through a formula $$N_{TB}*\frac{R}{2^n},$$

where $N_{TB}$ represents the number of currently scheduled TBs, R is the number of repeat times of TBs, n satisfies $$2^n-1 \leq \frac{R*N_{TB}}{\Theta} \leq 2^{n+1}-1,$$

where $\Theta$ is a preset threshold, the number of the gaps is $2^n-1$, n is an integer. Where, $2^n-1$ gaps are inserted based on the total length. Inserting gaps by this method is also inserting the gaps between the interleaved blocks. The number of the inserted gaps is determined according to the number of repeat times of TBs, the number of currently scheduled TBs and a preset threshold, and the gaps divide the scheduled multiple TBs uniformly. In a case where n satisfies $$2^n-1 \leq \frac{R*N_{TB}}{\Theta} \leq 2^{n+1}-1,$$

that is, a gap is inserted every $$N_{TB}*\frac{R}{2^n}$$

subframes.

For example, in a case where R=32, $N_{TB}$=7 and $\Theta$=64, satisfying the condition $$2^n-1 \leq \frac{R*N_{TB}}{\Theta} \leq 2^{n+1}-1$$

means satisfying the condition $$2^2-1 \leq \frac{32*7}{64} \leq 2^3-1,$$

that is, when n=2, 3 gaps may be inserted, and a gap is inserted every 56 subframes.

In an embodiment, in a case where the number of repeat times of TBs is less than a first threshold $\Theta1$, the number of gaps is x1; in a case where the number of repeat times of TBs is greater than the first threshold $\Theta1$, the number of gaps is x2. Where, x2>x1, and the value of x1 at least includes 1 gap, and the length of the gap may be configured by RRC. In an embodiment, in a case where a product of the number of repeat times R of TBs and the number $N_{TB}$ of the currently scheduled TBs is less than a first threshold $\Theta2$, the number of gaps is x1; and in a case where the number of repeat times of TBs is greater than the first threshold $\Theta2$, the number of gaps is x2. Where, x2>x1, and the value of x1 at least include 1 gap, and the length of the gap may be configured by the RRC.

In an embodiment, the scheduling indication method further includes:
determining positions of gaps, where, the number of the inserted gaps is configured through a radio resource control (RRC) signal, and the positions of the gaps are obtained according to the configured number of the inserted gaps. In a case where the number of the gaps is directly configured according to requirements, the number of the gaps may be configured directly through an RRC signal, which is simple. In CE mode A, the number of the gaps includes at least one of the following: 1 and 3; in CE mode B, the number of the gaps includes at least one of the following: 1, 3, 7, 15. Where, the length of the gap may also be configured by an RRC signal.

In an embodiment, in a case where multiple shared channels is scheduled through one PDCCH, the position of acknowledgement/non-acknowledgement (ACK/NACK) in $n+k_0-1$ subframes is indicated. n represents the position of an end subframe in a case of scheduling for multiple TBs, $n=k_0$. Where, Table 15 is a table of relationship between ACK/NACK resource domain indication, ACK/NACK subcarrier, and ACK/NACK delay according to related art.

TABLE 15

Table of relationship between ACK/NACK resource domain, ACK/NACK subcarrier, and scheduling delay according to related art

| ACK/NACK Resource Domain | ACK/NACK Subcarrier | Delay $k_0$ |
|---|---|---|
| 0 | 0 | a |
| 1 | 1 | a |
| 2 | 2 | a |
| 3 | 3 | a |
| 4 | 0 | b |
| 5 | 1 | b |
| 6 | 2 | b |
| 7 | 3 | b |
| 8 | 0 | c |
| 9 | 1 | c |
| 10 | 2 | c |
| 11 | 3 | c |
| 12 | 0 | d |
| 13 | 1 | d |
| 14 | 2 | d |
| 15 | 3 | d |

As shown in Table 15, in the related art, a=13, b=15, c=17, d=18. In a case of scheduling for multiple TBs, it may be attempted to make the delay $k_0$ smaller, to reduce the delay and improve the resource utilization efficiency.

In an embodiment, a=1, and in order to be the same as partial of the original scheduling, it may select c=13, d=17 and may select b as 9. In an embodiment, the uplink transition may be given more time, i.e., a=5. That is, there are two ways: a=1, b=9, c=13, d=17; and, a=5, b=9, c=13, d=17.

In an embodiment, in order to ensure that the maximum scheduling delay can be larger, it may select d=18, that is, it may include the following two ways: a=1, b=9, c=13, d=18; and a=5, b=9, c=13, d=18.

In an embodiment, at least one of the following states is included: a takes a value of 1 or 5, b takes a value of 9, c takes a value of 13, and d takes a value of 17 or 18. In an embodiment, according to the characteristics of scheduling for multiple TBs, changing the value of $k_0$ is conducive to saving the delay in resource scheduling.

FIG. 2 is a structural block diagram of a scheduling indication apparatus according to an embodiment of the present disclosure. As shown in FIG. 2, the scheduling indication apparatus according to an embodiment of the present disclosure includes a scheduling module 220.

The scheduling module 220 is configured to schedule multiple shared channels through a single physical downlink control channel (PDCCH); The scheduling information is carried in the single PDCCH, and is used to indicate the scheduling for processes corresponding to the shared channels, and the shared channels include a physical uplink shared channel (PUSCH) and/or a physical downlink shared channel (PDSCH).

The scheduling indication apparatus according to this embodiment is configured to implement the scheduling indication method according to the embodiment shown in FIG. 1, the scheduling indication apparatus according to this embodiment has similar implementation principles and technical effects to those of the scheduling indication method, the details are not repeated here.

In an embodiment, the scheduling information includes process identification information and new data indication (NDI) information corresponding to the processes, and the process identification information is used to indicate index information of scheduled processes, or a start position of indexes of scheduled processes and process number information.

In an embodiment, the scheduling information includes information for indicating scheduling for a single process or for multiple processes, process identification information, and NDI information corresponding to processes, where the process identification information is used to indicate index information of the scheduled processes, or a start position of indexes of scheduled processes and process number information.

In an embodiment, the scheduling information includes process number identification information, process identification information and NDI information corresponding to processes, where the process number identification information is used to indicate that the number of currently scheduled processes is greater than a threshold z or the number of currently scheduled processes is less than or equal to the threshold z, and the process identification information is used to indicate index information of the scheduled processes, or a start position of indexes of the scheduled processes and process number information of the scheduled processes.

In an embodiment, the scheduling information includes information for indicating scheduling for a hybrid transport or for a non-hybrid transport, process identification information, and NDI information corresponding to processes. The scheduling for a non-hybrid transport refers to that the scheduled processes correspond to same NDI information, and the scheduling for a hybrid transport refers to that the scheduled processes correspond to NDI information which is not completely the same, and the process identification information is used to indicate index information of the scheduled processes, or a start position of indexes of scheduled processes and process number information.

In an embodiment, in a case where the maximum number of processes scheduled through the downlink control information (DCI) is H, the scheduling information is X bits, and the scheduling information is used to indicate the scheduling state index M.

In an embodiment, the value of M is determined according to at least process identification information of currently scheduled processes and NDI information corresponding to the currently scheduled processes.

In an embodiment, the value of M being determined according to at least process identification information of currently scheduled processes and NDI information corresponding to the currently scheduled processes, includes:

the value of M is increased in accordance with the number of scheduled processes increasing; or, the value of M is increased in accordance with a start position of scheduled processes increasing.

In an embodiment, the value of M being increased in accordance with the number of scheduled processes increasing, satisfies:

$$M = m*2^j + x_m 2^{j-1} + x_{m+1} 2^{j-2} + \ldots + x_{m+j-1} 2^0 + \sum_{i=1}^{j-1} 2^i(H+1-i) + a$$

where, j is the number of the currently scheduled processes, m is a process identifier of a process at a start position of processes, and NDI information corresponding to j currently scheduled processes is $x_m, x_{m+1}, \ldots, x_{m+j-1}, \ldots, j \in \{1, 2, 3 \ldots, H\}$, $0<=H-j$, $x_m, x_{m+1}, \ldots, x_{m+j-2}, x_{m+j-1} \in \{0,1\}$, a is a start value of M, and a is an integer.

In an embodiment, the value of M being increased in accordance with a start position of scheduled processes increasing, satisfies:

$$M = \sum_{p=1}^{j-1} 2^p + \sum_{q=0}^{m-1} \sum_{r=1}^{H-q} 2^r + x_m 2^{j-1} + x_{m+1} 2^{j-2} + \ldots + x_{m+j-1} 2^0 + a$$

where, j is the number of processes currently scheduled, m is a process identifier of a process at a start position of processes, and NDI information corresponding to j currently scheduled processes is, $x_m, x_{m+1}, \ldots, x_{m+j-1}, j \in \{1, 2, 3 \ldots, H\}$, $0<=m<=H-j$, $1<=j<=H-m$, $x_m, x_{m+1}, \ldots, x_{m+j-2}, x_{m+j-1} \in \{0,1\}$, a is the start value of M, and a is an integer.

In an embodiment, in a case where the maximum number H of processes scheduled through DCI is 4, and scheduling information is X=5 bits, the scheduling state includes one of the following.

In a case where the number of currently scheduled processes is 4, the number of the scheduling state includes sixteen $x_0 x_1 x_2 x_3$; in a case where the number of the currently scheduled processes is 2, the number of the scheduling state includes four $x_0 x_1$ and four $x_2 x_3$; in a case where the number of the currently scheduled processes is 1, the number of the scheduling state includes two $x_0$, two $x_1$, two $x_2$ and two $x_3$, where $x_0, x_1, x_2$ and $x_3$ respectively correspond to NDI information corresponding to a processes with a process identifier 0, NDI information corresponding to a processes with a process identifier 1, NDI information corresponding to a processes with a process identifier 2 and NDI information corresponding to a processes with a process identifier 3, and each of $x_0, x_1, x_2$ and $x_3 \in \{0,1\}$.

In an embodiment, in a case where the maximum number H of processes scheduled through DCI is 4, and scheduling information is X=6 bits, the scheduling state includes one of the following.

In a case where the number of currently scheduled processes is 4, the number of the scheduling state includes sixteen $x_0 x_1 x_2 x_3$; in a case where the number of the currently scheduled processes is 3, the number of the scheduling state includes eight $x_0 x_1 x_2$ and eight $x_1 x_2 x_3$; in a case where the number of the currently scheduled processes is 2, the number of the scheduling state includes four $x_0 x_1$, four $x_1 x_2$, four $x_2 x_3$ four $x_1 x_3$, four $x_0 x_3$ and four $x_0 x_2$; in a case where the number of the currently scheduled processes is 1, the number of the scheduling state includes two $x_0$, two $x_1$, two $x_2$ and two $x_3$, where $x_0, x_1, x_2$ and $x_3$ respectively correspond to NDI information corresponding to a process with a process identifier 0, NDI information corresponding to a process with a process identifier 1, NDI information corresponding to a process with a process identifier 2 and NDI information corresponding to a process with a process identifier 3, and each of $x_0, x_1, x_2$ and $x_3 \in \{0,1\}$.

In an embodiment, the scheduling information includes 1 bit information for indicating scheduling for a single process or for multiple processes; in a case where the 1 bit information indicates a scheduling for multiple processes, j bits in X−1 bits are used to indicate NDI information of j processes, and X−1−j bits in the X−1 bits are used to indicate process identification information.

In an embodiment, in a case where X=10, the scheduling state indicated includes at least one of the following.

In a case where the number of currently scheduled processes is 8, 1 bit, for process identification information, in the 9 bits is indicated as x, and 8 bits for NDI correspond to 8 processes, the 8 processes include: $x_0 x_1 x_2 x_3 x_4 x_5 x_6 x_7$; in a case where the number of currently scheduled processes is 7, 2 bits, for process identification information, in the 9 bits are indicated as ~x, x, and 7 bits for NDI correspond to 7 processes, the 7 processes include: $x_0 x_1 x_2 x_3 x_4 x_5 x_6$ or $x_1 x_2 x_3 x_4 x_5 x_6 x_7$; in a case where the number of currently scheduled processes is 6, 3 bits, for process identification information, in the 9 bits are indicated as ~x, ~x, x, and 6 bits for NDI correspond to 6 processes, the 6 processes include $x_0 x_1 x_2 x_3 x_4 x_5$, $x_1 x_2 x_3 x_4 x_5 x_6$ or $x_2 x_3 x_4 x_5 x_6 x_7$; in a case where the number of currently scheduled processes is 5, 4 bits, for process identification information, in the 9 bits are indicated as ~x, ~x, ~x, x, and 5 bits for NDI correspond to 5 processes, the 5 processes include: $x_0 x_1 x_2 x_3 x_4$, $x_1 x_2 x_3 x_4 x_5$, $x_2 x_3 x_4 x_5 x_6$, $x_3 x_4 x_5 x_6 x_7$; in a case where the number of currently scheduled processes is 4, 5 bits, for process identification information, in the 9 bits are indicated as ~x, ~x, ~x, ~x, x, and 4 bits for NDI correspond to 4 processes, the 4 processes include: $x_0 x_1 x_2 x_3$, $x_1 x_2 x_3 x_4$, $x_2 x_3 x_4 x_5$, $x_3 x_4 x_5 x_6$ or $x_4 x_5 x_6 x_7$; in a case where the number of currently scheduled processes is 3, 6 bits, for process identification information, in the 9 bits are indicated as ~x, ~x, ~x, ~x, ~x, x, and 3 bits for NDI correspond to 3 processes, the 3 processes include: $x_0 x_1 x_2$, $x_1 x_2 x_3$, $x_2 x_3 x_4$, $x_3 x_4 x_5$, $x_4 x_5 x_6$ or $x_5 x_6 x_7$; in a case where the number of currently scheduled processes is 2, 7 bits, for process identification information, in the 9 bits are indicated as ~x, ~x, ~x, ~x, ~x, ~x, x, or ~x, ~x, ~x, ~x, ~x, ~x, ~x, and 2 bits for NDI correspond to 2 processes, the 2 processes include: $x_0 x_1$, $x_1 x_2$, $x_2 x_3$, $x_3 x_4$, $x_4 x_5$, $x_5 x_6$ or $x_6 x_7$; where $x \in \{0,1\}$, ~x denotes a negative x, $x_0, x_1, x_2, x_3, x_4, x_5, x_6, x_7$ respectively correspond to NDI information corresponding to a process with a process identifier 0, NDI information corresponding to a process with a process identifier 1, NDI information corresponding to a process with a process identifier 2, NDI information corresponding to a process with a process identifier 3, NDI information corresponding to a process with a process identifier 4, NDI information corresponding to a process with a process identifier 5, NDI information corresponding to a process with a process identifier 6, NDI information corresponding to a process with a process identifier 7, and each of $x_0, x_1, x_2, x_3, x_4, x_5, x_6, x_7 \in \{0,1\}$.

In an embodiment, in a case where the maximum number of processes scheduled through DCI is 4, the scheduling information X is 6 bits, where 5 bits for indicating scheduling for multiple processes in the 6 bits are used to indicate process identification information and NDI information corresponding to processes, and the scheduling state indicated by the 5 bits includes one of the following.

In a case where the number of currently scheduled processes is 4, 1 bit, for process identification information, in the 5 bits is indicated as x, 4 bits for NDI correspond to 4 processes, the 4 processes include $x_0x_1x_2x_3$; in a case where, the number of currently scheduled processes is 3, 2 bits, for process identification information, in the 5 bits are indicated as ~x, x, 3 bits for NDI correspond to 3 processes, the 3 processes include $x_0x_1x_2$ or $x_1x_2x_3$; in a case where, the number of currently scheduled processes is 2, 3 bits, for process identification information, in the 5 bits are indicated as ~x, ~x ~x or ~x, ~x, x, 2 bits for NDI correspond to 2 processes, the 2 processes include $x_0x_1$, $x_1x_2$ or $x_2x_3$; where, ~x denotes negative x, and $x_0$, $x_1$, $x_2$ and $x_3$ respectively correspond to NDI information corresponding to a process with a process identifier 0, NDI information corresponding to a process with a process identifier 1, NDI information corresponding to a process with a process identifier 2 and NDI information corresponding to a process with a process identifier 3, and each of $x_0$, $x_1$, $x_2$ and $x_3 \in \{0,1\}$.

In an embodiment, when the scheduling information indicates scheduling for multiple processes, the scheduling information further includes information used to indicate scheduling for a hybrid transport or for a non-hybrid transport; or, the scheduling information further includes process number identification information, where the process number identification information is used to indicate that the number of currently scheduled processes is greater than a threshold z or the number of currently scheduled processes is less than or equal to the threshold z.

In an embodiment, the scheduling information includes process number identification information. In a case where the process number identification information indicates that the number of currently scheduled processes is greater than a threshold z, identifiers of the scheduled processes in scheduling information are consecutive.

In an embodiment, the scheduling information further includes:
in X−1 bits, j bits used to indicate NDI information of j processes, and X−1−j bits used to indicate process identification information.

In an embodiment, in a case where the maximum number of scheduled processes is 8 and the scheduling information X is 10 bits, the scheduling state indicated includes one of the following.

In a case where the number of currently scheduled processes is 8, 8 bits for NDI correspond to 8 processes, the 8 processes include: $x_0x_1x_2x_3x_4x_5x_6x_7$; in a case where the number of the currently scheduled processes is 7, 7 bits for NDI correspond to 7 processes, the 7 processes include: $x_0x_1x_2x_3x_4x_5x\ x_6$ or $x_1x_2x_3x_4x_5x_6x_7$; in a case where the number of the currently scheduled processes is 6, 6 bits for NDI correspond to 6 processes, the 6 processes include: $x_0x_1x_2x_3x_4x_5$, $x_1x_2x_3x_4\ x_5\ x_6$ or $x_2x_3x_4x_5x_6x_7$; in a case where the number of the currently scheduled processes is 5, 5 bits for NDI correspond to 5 processes, the 5 processes include: $x_0x_1x_2x_3x_4$, $x_1x_2x_3x_4x_5$, $x_2\ x_3\ x_4\ x_5\ x_6$ or $x_3x_4x_5x_6x_7$; where $x_0$, $x_1$, $x_2$, $x_3$, $x_4$, $x_5$, $x_6$, $x_7$ respectively corresponds to NDI information corresponding to a process with a process identifier 0, NDI information corresponding to a process with a process identifier 1, NDI information corresponding to a process with a process identifier 2, NDI information corresponding to a process with a process identifier 3, NDI information corresponding to a process with a process identifier 4, NDI information corresponding to a process with a process identifier 5, NDI information corresponding to a process with a process identifier 6, and NDI information corresponding to a process with a process identifier 7, and each of $x_0$, $x_1$, $x_2$, $x_3$, $x_4$, $x_5$, $x_6$, $x_7 \in \{0,1\}$.

In an embodiment, in a case where the maximum number of scheduled processes is 4, the scheduling state corresponding to the scheduling information includes one of the following.

In a case where the number of currently scheduled processes is 4, the number of the scheduling state includes sixteen $x_0x_1x_2x_3$; in a case where the number of the currently scheduled processes is 3, the number of the scheduling state includes eight $x_0x_1x_2$ and eight $x_1x_2x_3$, where, $x_0$, $x_1$, $x_2$ and $x_3$ respectively correspond to NDI information corresponding to a process with a process identifier 0, NDI information corresponding to a process with a process identifier 1, NDI information corresponding to a process with a process identifier 2, NDI information corresponding to a process with a process identifier 3, and each of $x_0$, $x_1$, $x_2$ and $x_3 \in \{0,1\}$.

In an embodiment, the scheduling information includes process number identification information. In a case where the process number identification information indicates that the number of currently scheduled processes is less than or equal to a threshold z, the process identification information further includes information about process group of scheduled processes and process identification information within a process group, where the process identification information within the process group and the NDI information of the scheduled processes are jointly indicated or separately indicated.

In an embodiment, in a case where the maximum number of scheduled processes is 8, z=4, and X=10, 1 bit in scheduling information is used to indicate that information about process group of scheduled processes is processes 0123 or processes 4567, 4 bits in the remaining 8 bits indicate in a bitmap positions and number of 4 processes, and other 4 bits are used to indicate NDI of 4 processes; or in a case where the maximum number of scheduled processes is 8 and z=4, 2 bits in the scheduling information are used to indicate information about process group of scheduled processes is processes 0123, processes 2345, processes 4567, or processes 6710, and the remaining 7 bits are used to indicate process identification information (e.g., HARQ process identifier (ID)) within the process group and the NDI information of the scheduled processes.

In an embodiment, 1 bit in the scheduling information is used to indicate that the number of currently scheduled processes is greater than a threshold z or the number of currently scheduled processes is less than or equal to the threshold z. In a case where the maximum number of scheduled processes is 4 and z=2, the scheduling state corresponding to the scheduling information includes one of the following.

In a case where the number of the currently scheduled processes is 1, the number of the scheduling state includes two $x_0$, two, two $x_1$, two $x_2$ and two $x_3$.

In a case where the number of the currently scheduled processes is 2, the number of the scheduling state includes four $x_0x_1$, four $x_1x_2$, four $x_2x_3$, four $x_1x_3$, four $x_0x_3$ and four $x_0x_2$. In a case where the number of the currently scheduled processes is 4, the number of the scheduling state includes sixteen $x_0x_1x_2x_3$.

In a case where the number of the currently scheduled processes is 3, the number of the scheduling state includes eight $x_0x_1x_2$ or eight $x_1x_2x_3$. Where, $x_0$, $x_1$, $x_2$ and $x_3$ respectively correspond to NDI information corresponding to a process with a process identifier 0, NDI information corresponding to a process with a process identifier 1, NDI information corresponding to a process with a process identifier 2 and NDI information corresponding to a process with a process identifier 3, and each of $x_0$, $x_1$, $x_2$ and $x_3 \in \{0,1\}$.

In an embodiment, in a case where the scheduling information is indicated as a non-hybrid transport scheduling, process positions and process number are indicated in a form of bitmap, and the scheduled processes correspond to the same NDI information, and the NDI information is indicated by 1 bit.

In an embodiment, in a case where the scheduling information is indicated as a hybrid transport scheduling, process identifiers of the scheduled processes in the scheduling information are consecutive, and each scheduled process has a corresponding 1 bit for NDI information.

In an embodiment, in a case where the maximum number of scheduled processes is 8, the scheduling information X is 10 bits; or, in a case where the maximum number of scheduled processes is 4, the scheduling information is 6 bits.

In an embodiment, the scheduling indication method further includes: indicating a modulation and decoding scheme (MCS) domain of the multiple shared channels. Specifically, an MCS domain when scheduling for the multiple shared channels enabled is 1 bit less than an MCS domain when scheduling for the multiple shared channels disabled; in a case where a first mode is adopted, indexes of the MCS domain when scheduling for the multiple shared channels enabled are odd indexes or even indexes of indexes $I_{MCS}$ of the MCS domain when scheduling for the multiple shared channels disabled.

In an embodiment, the scheduling indication method further includes:

indicating a modulation coding scheme MCS domain of the multiple shared channels. Specifically, the MCS domain when scheduling for the multiple shared channels enabled is one bit less than an MCS domain when scheduling for the multiple shared channels disabled. In a case where a second mode is adopted, indexes of the MCS domain when scheduling for the multiple shared channels enabled are preset consecutive indexes of the MCS domain when scheduling for the multiple shared channels disabled, or the indexes of the MCS domain when scheduling for the multiple shared channels enabled include preset consecutive indexes and D preset indexes of the MCS domain when scheduling for the multiple shared channels disabled.

In an embodiment, the scheduling indication method further includes:

indicating a modulation coding scheme MCS domain of the multiple shared channels. Specifically, the MCS domain when scheduling for the multiple shared channels enabled is two bits less than an MCS domain when scheduling for the multiple shared channels disabled. In a case where a second mode is adopted, indexes of the MCS domain when scheduling for the multiple shared channels enabled are preset consecutive indexes of the MCS domain when scheduling for the multiple shared channels disabled, or the indexes of the MCS domain when scheduling for the multiple shared channels enabled are indexes selected from indexes of the MCS domain when scheduling for the multiple shared channels disabled. a selection principle is $I_{MCS}=P*n+Q$, P, Q and n are all integers, and $I_{MCS}$ is an integer with a value range from 0 to 15.

In an embodiment, in a case where P=2, $I_{MCS}=2n+Q$, the value of Q is at least one of the following: 1, 3, 5, 7, 9; or in a case where P=3, $I_{MCS}=3n+Q$, the value of Q is at least one of the following: −3, 0, 3, 6 and 9; or in a case where P=4, $I_{MCS}=4n+Q$, the value of Q is at least one of the following: −1, 3, 7; or, in a case where P=5, $I_{MCS}=5n$, the value of Q is 0.

In an embodiment, the scheduling indication method further includes indicating a resource allocation domain of the multiple shared channels. In a case where the first mode is adopted, the resource allocation domain occupies one bit, and includes a state in which the number of corresponding physical resource blocks PRBs is 6 and a state in which the number of corresponding physical resource blocks PRBs is 4.

In an embodiment, the scheduling indication method further includes: indicating a resource allocation domain of the multiple shared channels. In a case where the first mode is adopted, the resource allocation domain occupies two bits, three bits, or four bits and includes a state of {0,1,2,3,4,5} in which all 6 PRBs are scheduled, where {0,1,2,3,4,5} represents that the PRBs with identifiers 0, 1, 2, 3, 4, 5 in the narrow band are used when being scheduled.

In an embodiment, a resource allocation domain of the multiple shared channels is indicated that, in a case where the first mode is adopted, the resource allocation domain occupies two bits, and includes one of the following scheduling states: {0,1,2,3,4,5}, {0,1,2}, {3,41,15}; or {0,1,2,3, 4,5}, {0,1,2,3}, {4}, {5}; or {0,1,2,3,4,5}, {0,1,2,3}, {4,5}, {5}.

In an embodiment, a resource allocation domain of multiple shared channels is indicated that, in a case where the first mode is adopted, the resource allocation domain occupies three bits, and includes one of the following scheduling states: {0,1,2,3,4,5}, {0,1,2,3,4}, {0,1,2,3}, {0,1,2}, {4,5}, {3}, {4}, {5}; or, {0,1,2,3,4,5}, {0,1,2,3,4}, {0,1,2,3}, {0,1, 2}, {3,4,5}, {0,1}, {2,3}, {4,5}; where, {0,1,2,3,4,5} indicates that PRBs with identifiers 0, 1, 2, 3, 4, 5 in the narrow band are all occupied when being scheduled.

In an embodiment, a resource allocation domain of the multiple shared channels is indicated that, in a case where the first mode is adopted, the resource allocation domain occupies 4 bits, and includes at least one of the following scheduling states: {0,1,2,3,4,5}, {0,1,2,3,4}, {0,1,2,3}, {0,1, 2}, {3,4,5}, {0,1}, {2,3}, {4,5}, {0}, {1}, {2}, {3}, {4}, {5}, {1,2,3,4,5}, {2,3,4,5}.

In an embodiment, a resource allocation domain of the multiple shared channels is indicated that, in a case where the second mode is adopted, the resource allocation domain occupies one bit, includes a scheduling state in which the number of corresponding PRBs is 1 and a scheduling state in which the number of corresponding PRBs is 2.

In an embodiment, a resource allocation domain of multiple shared channels is indicated that, in a case where the second mode is adopted, the resource allocation domain occupies two bits, and includes a scheduling state in which the number of corresponding PRBs is 2 and a scheduling state in which the number of corresponding PRBs is 1, and the scheduling states include one of the following: {4}, {5}, {0,1}, {2,3}.

FIG. 3 is a schematic structural diagram of a device according to an embodiment of the present application. As shown in FIG. 3, the device according to the present application includes a processor 310 and a memory 320. The device may include one or more processors 310, and one processor 310 is taken as an example in FIG. 3. The device may include one or more memories 320, and one memory

320 is taken as an example in FIG. 3. The processor 310 and the memory 320 in the device can be connected through a bus or other means; and in FIG. 3 a bus is taken as an example. In an embodiment, the device may be one of a base station or UE.

As a computer-readable storage medium, the memory 320 may be configured to store a software program, a computer-executable program and a module, as the program instructions/modules corresponding to the device in any embodiment of the present application (e.g., the scheduling module in the scheduling indication apparatus). The memory 320 may include a program storage area and a data storage area, where the program storage area may store an operating system and an application program required by at least one function; The data storage area can store data created according to the use of the device, and etc. Further, the memory 320 may include a high-speed random access memory, and may further include a non-volatile memory, such as at least one magnetic disk storage apparatus, a flash memory device, or other non-volatile solid-state storage apparatus. In some examples, the memory 320 may include a memory remotely provided with respect to the processor 310, and these remote memories may be connected to the device through a network. Examples of the aforementioned network include, but are not limited to, the internet, corporate intranets, local area networks, mobile communication networks, and combinations thereof.

The above-provided device can be configured to execute the scheduling indication method according to any of the above-described embodiments, and has corresponding functions and effects.

It is further provided according to an embodiment of the present application a storage medium including a non-transitory computer-executable instruction, the computer-executable instruction is configured to perform a scheduling indication method when executed by a computer processor, the method is applied to a base station or a UE, and the method includes scheduling multiple shared channels through a single physical downlink control channel (PDCCH); where scheduling information is carried in the single PDCCH, and is used to indicate scheduling for processes corresponding to the multiple shared channels, the multiple shared channels include a PUSCH and/or a PDSCH.

The term user equipment encompasses any appropriate type of radio user device, such as a mobile phone, a portable data processing apparatus, a portable web browser, or a vehicle-mounted mobile station.

In general, the various embodiments of the present application may be implemented in hardware or a dedicated circuit, software, logic, or any combination thereof. For example, some aspects may be implemented in hardware while other aspects may be implemented in firmware or software that may be executed by a controller, a microprocessor, or other computing apparatuses, although the present application is not limited thereto.

Embodiments of the present application may be implemented by a data processor of a mobile apparatus executing computer program instructions, for example, in a processor entity, or embodiments of the present application may be implemented by hardware, or by a combination of software and hardware. The computer program instructions may be assembly instructions, instruction set architecture (ISA) instructions, machine instructions, machine-related instructions, micro-codes, firmware instructions, state setting data, or source codes or object codes written in any combination of one or more programming languages.

The block diagrams of any logic flow in drawings of the present application may represent program steps, or may represent interconnected logic circuits, modules, and functions, or may represent a combination of program steps, logic circuits, modules, and functions. The computer programs may be stored in a memory. The memory may be of any type suitable for a local technical environment and may be implemented using any suitable data storage technology, such as, but not limited to, a read-only memory (ROM), a random-access memory (RAM) and an optical memory apparatus and system (digital video disc (DVD) or compact disc (CD)). The computer-readable storage medium may include a non-transitory storage medium. The data processor may be of any type appropriate for the local technical environment such as, but not limited to, a general-purpose computer, a special purpose computer, a microprocessor, a digital signal processor (DSP), an application specific integrated circuit (ASIC), a field-programmable gate array (FPGA), and a processor based on a multi-core processor architecture.

What is claimed is:

1. A scheduling indication method, comprising:
   scheduling a plurality of shared channels through a single physical downlink control channel (PDCCH);
   wherein scheduling information is carried in the single PDCCH, and is used to indicate scheduling for processes corresponding to the plurality of shared channels, the plurality of shared channels comprise at least one of a physical uplink shared channel (PUSCH) and a physical downlink shared channel (PDSCH);
   wherein the scheduling information comprises process identification information and new data indication (NDI) information corresponding to processes;
   wherein the process identification information is used to indicate index information of scheduled processes, or is used to indicate a start position of indexes of scheduled processes and process number information;
   wherein in a case where the maximum number of processes scheduled through downlink control information (DCI) is H, the scheduling information is X bits, and the scheduling information is used to indicate an index M of scheduling state;
   wherein values of M are determined according to at least process identification information of currently scheduled processes and NDI information corresponding to the currently scheduled processes; and
   wherein the value of M is determined according to at least process identification information of currently scheduled processes and NDI information corresponding to the currently scheduled processes, comprising:
   the values of M are increased in accordance with the number of scheduled processes increasing; or, the values of M are increased in accordance with a start position of scheduled processes increasing.

2. The method according to claim 1, wherein the scheduling information comprises information for indicating scheduling for a single process or for a plurality of processes, process identification information, and NDI information corresponding to processes.

3. The method according to claim 1, wherein the scheduling information comprises process number identification information, process identification information and NDI information corresponding to processes, wherein the process number identification information is used to indicate that a number of currently scheduled processes is greater than a threshold z or a number of currently scheduled process is less than or equal to a threshold z, and the process identification information is used to indicate index information of scheduled processes, or a start position of indexes of scheduled processes and process number information.

4. The method according to claim 1, wherein the scheduling information comprises information for indicating scheduling for a hybrid transport or a non-hybrid transport, process identification information and NDI information corresponding to processes, wherein the non-hybrid transport scheduling refers to that scheduled processes correspond to same NDI information, and the hybrid transport scheduling refers to that the NDI information corresponding to the scheduled processes is not completely the same; the process identification information is used to indicate index information of scheduled processes, or a start position of indexes of scheduled processes and process number information.

5. The method according to claim 2, wherein the scheduling information comprises 1 bit information for indicating scheduling for a single process or for a plurality of processes;
in a case where the 1 bit information indicates scheduling for a plurality of processes, j bits in X−1 bits are used to indicate NDI information corresponding to j processes, X−1−j bits in the X−1 bits are used to indicate process identification information, X is a number of bits of the scheduling information, and j is a number of currently scheduled processes.

6. The method according to claim 5, wherein in a case of X=10, the scheduling state indicated comprises one of:
in a case where a number of currently scheduled processes is 8, 1 bit, for process identification information, in 9 bits is indicated as x, and 8 bits for NDI correspond to 8 processes, the 8 processes comprising $x_0x_1x_2x_3x_4x_5x_6x_7$;
in a case where a number of currently scheduled processes is 7, 2 bits for process identification information in the 9 bits are indicated as ∼x, x, and 7 bits for NDI correspond to 7 processes, the 7 processes comprising $x_0x_1x_2x_3x_4x_5x_6$ or $x_1x_2x_3x_4x_5x_6x_7$;
in a case where a number of currently scheduled processes is 6, 3 bits, for process identification information, in the 9 bits are indicated as ∼x, ∼x, x, and 6 bits for NDI correspond to 6 processes, the 6 processes comprising $x_0x_1x_2x_3x_4x_5$, $x_1x_2x_3x_4x_5x_6$ or $x_2x_3x_4x_5x_6x_7$;
in a case where a number of currently scheduled processes is 5, 4 bits, for process identification information, in the 9 bits are indicated as ∼x, ∼x, ∼x, x, and 5 bits for NDI correspond to 5 processes, the 5 processes comprising: $x_0x_1x_2x_3x_4$, $x_1x_2x_3x_4x_5$, $x_2x_3x_4x_5x_6$ or $x_3x_4x_5x_6x_7$;
in a case where a number of currently scheduled processes is 4, 5 bits, for process identification information, in the 9 bits are indicated as ∼x, ∼x, ∼x, ∼x, x, and 4 bits for NDI correspond to 4 processes, the 4 processes comprising: $x_0x_1x_2x_3$, $x_1x_2x_3x_4$, $x_2x_3x_4x_5$, $x_3x_4x_5x_6$ or $x_4x_5x_6x_7$;
in a case where a number of currently scheduled processes is 3, 6 bits, for process identification information, in the 9 bits are indicated as ∼x, ∼x, ∼x, ∼x, ∼x, x, and 3 bits for NDI correspond to 3 processes, the 3 processes comprising: $x_0x_1x_2$, $x_1x_2x_3$, $x_2x_3x_4$, $x_3x_4x_5$, $x_4x_5x_6$ or $x_5x_6x_7$;
in a case where a number of currently scheduled processes is 2, 7 bits, for process identification information, in the 9 bits are indicated as ∼x, ∼x, ∼x, ∼x, ∼x, ∼x, x, or ∼x, ∼x, ∼x, ∼x, ∼x, ∼x, x, and 2 bits for NDI correspond to 2 processes, the 2 processes comprising: $x_0x_1$, $x_1x_2$, $x_2x_3$, $x_3x_4$, $x_4x_5$, $x_5x_6$ or $x_6x_7$; and wherein x∈{0, 1}, ∼x denotes a negative x, $x_0$, $x_1$, $x_2$, $x_3$, $x_4$, $x_5$, $x_6$, $x_7$ respectively correspond to NDI information corresponding to a process with a process identifier as 0, NDI information corresponding to a process with a process identifier as 1, NDI information corresponding to a process with a process identifier as 2, NDI information corresponding to a process with a process identifier as 3, NDI information corresponding to a process with a process identifier as 4, NDI information corresponding to a process with a process identifier as 5, NDI information corresponding to a process with a process identifier as 6, and NDI information corresponding to a process with a process identifier as 7, and each of $x_0$, $x_1$, $x_2$, $x_3$, $x_4$, $x_5$, $x_6$, $x_7 \in \{0,1\}$.

7. The method according to claim 5, wherein in a case where the maximum number of processes scheduled through DCI is 4, the scheduling information is 6 bits, wherein 5 bits in the 6 bits are used to indicate process identification information of scheduling for a plurality of processes and NDI information corresponding to processes, and the scheduling state indicated by the 5 bits comprises at least one of:
in a case where a number of currently scheduled processes is 4, 1 bit, for process identification information, in the 5 bits is indicated as x, 4 bits for NDI correspond to 4 processes, the 4 processes comprising $x_0x_1x_2x_3$;
in a case where, a number of currently scheduled processes is 3, 2 bits, for process identification information, in the 5 bits are indicated as ∼x, x, 3 bits for NDI correspond to 3 processes, the 3 processes comprising $x_0x_1x_2$ or $x_1x_2x_3$;
in a case where, a number of currently scheduled processes is 2, 3 bits, for process identification information, in the 5 bits are indicated as ∼x, ∼x ∼x or ∼x, ∼x, x, 2 bits for NDI correspond to 2 processes, the 2 processes comprising $x_0x_1$, $x_1x_2$ or $x_2x_3$;
wherein, x∈{0,1}, ∼x denotes negative x, $x_0$, $x_1$, $x_2$ and $x_3$ respectively correspond to NDI information corresponding to a process with a process identifier as 0, NDI information corresponding to a process with a process identifier as 1, NDI information corresponding to a process with a process identifier as 2 and NDI information corresponding to a process with a process identifier as 3, each of $x_0$, $x_1$, $x_2$, $x_3 \in \{0,1\}$.

8. The method according to claim 2, wherein in a case where the scheduling information indicates scheduling for a plurality of process, the scheduling information further comprises information used to indicate scheduling for a hybrid transport scheduling or a non-hybrid transport scheduling; or, the scheduling information further comprises process number identification information, wherein the process number identification information is used to indicate that a number of currently scheduled processes is greater than a threshold z or a number of currently scheduled processes is less than or equal to the threshold z.

9. The method according to claim 1, further comprising:
indicating an MCS domain of the plurality of shared channels, wherein an MCS domain corresponding to a case of scheduling for the plurality of shared channels enabled is 2 bits less than an MCS domain corresponding to a case of scheduling for the plurality of shared channels disabled; and
indexes of the MCS domain corresponding to a case of scheduling for the plurality of shared channels enabled are selected from indexes of an MCS domain corresponding to a case of scheduling for the plurality of shared channels disabled, wherein a selection principle is $I_{MCS}=P*n+Q$, P, Q and n are all integers, and $I_{MCS}$ is an integer with a value range from 0 to 15.

10. The method according to claim 9, wherein
in a case of P=2, $I_{MCS}=2n+Q$, Q is at least one of 1, 3, 5, 7, 9; or
in a case of P=3, $I_{MCS}=3n+Q$, Q is at least one of −3, 0, 3, 6, 9; or
in a case of P=4, $I_{MCS}=4n+Q$, Q is at least one of −1, 3, 7; or,
in a case of P=5, Q is 0, $I_{MCS}=5n$.

11. The method according to claim 1, further comprising:
indicating a resource allocation domain of the plurality of shared channels; wherein in a case where a first mode is adopted, the resource allocation domain occupies 1 bit, and comprises a state in which the number of corresponding physical resource blocks (PRB) is 6 and a state in which the number of corresponding PRBs is 4.

12. The method according to claim 1, further comprising:
determining positions of gaps, wherein, a gap is inserted every first preset subframes, a number of the first preset subframes is determined according to an interleaving granularity of transport blocks (TB), a number of currently scheduled TBs, and a preset threshold value, and the number of the first preset subframes is calculated through the following formular:

$$G*N_{TB}*\left\lceil\frac{\Theta}{G*N_{TB}}\right\rceil, \text{ or } G*N_{TB}*\left\lfloor\frac{\Theta}{G*N_{TB}}\right\rfloor;$$

wherein, G is the interleaving granularity, $N_{TB}$ represents a number of currently scheduled TBs, Θ is the preset threshold, $\lceil\ \rceil$ is round up, and $\lfloor\ \rfloor$ is round down.

13. The method according to claim 1, further comprising:
determining positions of gaps, wherein a gap is inserted every second preset subframes, a number of the second preset subframes is determined according to a number of currently scheduled TBs, a number of repeat times of TBs, and a number of the inserted gaps, the number of the second preset subframes is calculated through the following formular:

$$N_{TB}*\frac{R}{2^n},$$

wherein, $N_{TB}$ represents a number of currently scheduled TBs, R is a number of repeat times of TBs, n satisfies $$2^n-1\le\frac{R*N_{TB}}{\Theta}\le 2^{n+1}-1,$$

Θ is a preset threshold, the number of the inserted gaps is $2^n-1$, and n is an integer.

14. The method according to claim 1, further comprising:
determining positions of gaps, wherein, a number of the inserted gaps is configured through a radio resource control (RRC) signal, and the positions of the gaps are obtained according to the configured number of the inserted gaps.

15. A scheduling indication apparatus, comprising:
a scheduling module configured to schedule a plurality of shared channels through a single physical downlink control channel (PDCCH);
wherein scheduling information is carried in the single PDCCH to indicate scheduling for processes corresponding to the plurality of shared channels, the plurality of shared channels comprise at least one of a physical uplink shared channel (PUSCH) and a physical downlink shared channel (PDSCH);
wherein the scheduling information comprises process identification information and new data indication (NDI) information corresponding to processes;
wherein the process identification information is used to indicate index information of scheduled processes, or is used to indicate a start position of indexes of scheduled processes and process number information;
wherein in a case where the maximum number of processes scheduled through downlink control information (DCI) is H, the scheduling information is X bits, and the scheduling information is used to indicate an index M of scheduling state;
wherein values of M are determined according to at least process identification information of currently scheduled processes and NDI information corresponding to the currently scheduled processes; and
wherein the value of M is determined according to at least process identification information of currently scheduled processes and NDI information corresponding to the currently scheduled processes, comprising:
the value of M is increased in accordance with the number of scheduled processes increasing: or, the value of M is increased in accordance with a start position of scheduled processes increasing.

16. A non-transitory computer-readable storage medium storing a computer program, wherein the computer program, when executed by a processor, implements the scheduling indication method according to claim 1.

* * * * *

UNITED STATES PATENT AND TRADEMARK OFFICE
CERTIFICATE OF CORRECTION

PATENT NO. : 12,075,436 B2
APPLICATION NO. : 17/633172
DATED : August 27, 2024
INVENTOR(S) : Youjun Hu et al.

It is certified that error appears in the above-identified patent and that said Letters Patent is hereby corrected as shown below:

In the Specification

Column 3-4, Line 58 (approx.) (Table 1), delete "0. The" and insert -- 0, The --.

Column 8, Line 14 (approx.) (Table 2), before "Value of" delete "2" and insert -- j --.

Column 12, Line 16 (approx.), delete "$x_4x_5x_6x_7$;" and insert -- $x_5x_6x_7$: --.

Column 12, Line 33 (approx.), delete "$x_2x\ x_3$," and insert -- $x_2,x_3$, --.

Column 16, Line 33 (approx.), delete "$x_1x_2x_3x_4x_5x_6\ x_7$;" and insert -- $x_1x_2x_3x_4x_5x_6x_7$; --.

Column 25, Line 1, After "$I_{MCS}$" insert -- of --.

Column 28, Line 4, delete "10,11," and insert -- {0,1}, --.

Column 29, Line 42 (approx.), delete "τ" and insert -- Θ --.

Column 33, Line 19 (approx.), delete "0<=H–j," and insert -- 0<=m<=H–j, --.

Column 35, Line 52, delete "$x_0x_1x_2x_3x_4x_5x\ x_6$" and insert -- $x_0x_1x_2x_3x_4x_5x_6$ --.

Column 35, Line 55, delete "$x_1x_2x_3x_4\ x_5\ x_6$" and insert -- $x_1x_2x_3x_4x_5x_6$ --.

Column 35, Line 58, delete "$x_2\ x_3\ x_4\ x_5\ x_6$" and insert -- $x_2x_3x_4x_5x_6$ --.

Column 38, Line 6, delete "$I_{MCS}5n$," and insert -- $I_{MCS}=5n$, --.

Column 38, Line 28, delete "{3,41,15};" and insert -- {3,4},{5}; --.

Signed and Sealed this
Seventeenth Day of December, 2024

Derrick Brent
*Acting Director of the United States Patent and Trademark Office*

In the Claims

Column 44, Line 44, Claim 15, delete "increasing:" and insert -- increasing; --.